US011294784B1

(12) United States Patent
Bergman et al.

(10) Patent No.: US 11,294,784 B1
(45) Date of Patent: Apr. 5, 2022

(54) TECHNIQUES FOR PROVIDING PREDICTIVE INTERFACE ELEMENTS

(71) Applicant: Amazon Technologies, Inc., Seattle, WA (US)

(72) Inventors: Erik Bergman, Seattle, WA (US); Katherine M. Ryan, Seattle, WA (US); Jera Vincelli, Seattle, WA (US); Edward Michael Leonard, Snoqualmie, WA (US); Alper Aras, Seattle, WA (US); Jeffrey Pratt, Seattle, WA (US); Christer Garbis, Kirkland, WA (US); James Rosenblum, Seattle, WA (US); Brian Kropf, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 16/584,524

(22) Filed: Sep. 26, 2019

(51) Int. Cl.
*G06F 11/34* (2006.01)
*G06F 9/451* (2018.01)
*G06N 20/00* (2019.01)
*G06F 3/0482* (2013.01)

(52) U.S. Cl.
CPC ........ *G06F 11/3438* (2013.01); *G06F 3/0482* (2013.01); *G06F 9/453* (2018.02); *G06N 20/00* (2019.01)

(58) Field of Classification Search
None
See application file for complete search history.

(56) References Cited

U.S. PATENT DOCUMENTS

| 10,142,486 | B1 | 11/2018 | Reeder et al. | |
| 10,235,639 | B1* | 3/2019 | Mandel | H04M 3/5166 |
| 2012/0296927 | A1* | 11/2012 | Velipasaoglu | G06F 16/00 707/768 |
| 2013/0211880 | A1* | 8/2013 | Kannan | G06Q 30/0203 705/7.32 |
| 2014/0108978 | A1* | 4/2014 | Yu | G06F 3/04817 715/765 |
| 2014/0207509 | A1* | 7/2014 | Yu | G06Q 10/1095 705/7.19 |
| 2017/0308583 | A1* | 10/2017 | Husain | G06F 16/3322 |
| 2017/0372231 | A1* | 12/2017 | Ghatage | G06Q 10/0631 |

(Continued)

*Primary Examiner* — Ryan Barrett
(74) *Attorney, Agent, or Firm* — Kilpatrick Townsend & Stockton LLP

(57) ABSTRACT

Systems and methods are described herein for providing predictive user interface elements. A computing system may train a machine-learning model to identify issues that are likely being experienced by users contacting a customer service system based at least in part on historical user account data of a plurality of user accounts. When a request for assistance is received, user account data corresponding to the request may be obtained and provided to the model to identify issues likely experienced by a user. A number of graphical user interface (GUI) elements (e.g., "match cards"), each corresponding to one of the identified issues, may be generated, ranked, and presented in accordance with the ranking. Each GUI element may be selectable. Upon selection additional data likely to be pertinent to the selected issue may be presented alleviating a need to search for this data as would be the case in conventional systems.

20 Claims, 14 Drawing Sheets

(56) References Cited

U.S. PATENT DOCUMENTS

| | | | |
|---|---|---|---|
| 2018/0012232 A1* | 1/2018 | Sehrawat | G06F 21/31 |
| 2018/0061400 A1* | 3/2018 | Carbune | G06F 16/3331 |
| 2018/0211260 A1* | 7/2018 | Zhang | G06Q 30/016 |
| 2018/0316636 A1* | 11/2018 | Kamat | H04L 51/046 |
| 2018/0366024 A1* | 12/2018 | Yom-Tov | G06F 16/284 |
| 2019/0227822 A1* | 7/2019 | Azmoon | G06F 40/35 |
| 2019/0258722 A1* | 8/2019 | Guo | G06N 3/0454 |
| 2020/0019420 A1* | 1/2020 | Saimani | G06N 20/00 |
| 2020/0151648 A1* | 5/2020 | Gorny | G06Q 10/063114 |
| 2020/0242623 A1* | 7/2020 | Savir | G06N 3/0454 |
| 2020/0258013 A1* | 8/2020 | Monnett | G06Q 30/016 |
| 2020/0265444 A1* | 8/2020 | Pachauri | G06F 9/451 |
| 2020/0410506 A1* | 12/2020 | Jones | G06N 20/10 |

\* cited by examiner

FIG. 7

Jenna Doe

Issues resolved

- Successfully cancelled membership subscription and refunded $45.01
- Successfully issued a returnless refund for an item under review for $7.09
- Successfully sent a credit card renewal link to the customer email
- + Add an issue Customer email Issues resolved above are reflected below. You cannot modify the content below.

Hello Jenna,

Thanks for calling us today.

I've cancelled your membership. You'll receive a refund of $45.01 of the membership fee. Refunds typically process within 3-5 business days and appear as a credit on your statement.

Since we're unable to send out a replacement for the SparkyFish cat food, I've requested a full refund of $7.09 to the original payment method used. There's no need to return the item and you can dispose of it at your convenience. Refunds typically process within 3-5 business days and appear as a credit on your statement.

Please be aware that your credit card has expired. To update your credit card, please visit: https://www.exampleprovider.com/cpe/managepaymentmethods?ref=ya_d_c_pmt_mpo&

We look forward to seeing you again soon.

Sincerely,

Amy
Customer Service

[Standard signature]

[Send and finish]

Your achievements this call

- 3 issues resolved in one session!
- Less than 1 minute to accurately match the first issue
- Your average handle time per issue was 20% faster than usual Tips

- When cancelling an annual subscription, be sure to offer the monthly option.
- When sending a link for credit card renewal, consider creating a follow-up email a week later.
- Before finishing a call, don't forget to ask if there's anything else you can do for them.

*FIG. 11*

TECHNIQUES FOR PROVIDING PREDICTIVE INTERFACE ELEMENTS

BACKGROUND

Customer service agents (CSAs) commonly interact with customers to identify resolutions to a variety of issues experienced by the customer. As an example, a customer service system may include a call center that receives phone calls regarding some aspect of the customer's experience. Conventional customer service systems can require users (e.g., CSAs) to navigate through complex trouble shooting workflows to identify a variety of data needed to 1) identify the issue and 2) to identify one or more potential resolutions to the issue. This creates a lengthy and frustrating experience for the CSAs and customers alike. Additionally, these types of systems may extend the length of time needed for a CSA to reach system proficiency. This extended training requirement can negatively impact the length of these customer interactions and contribute to high CSA attrition rates. These factors can make scaling for growth difficult and may introduce variability to resolutions for similar contact reasons resulting in repeated contacts, which in turn may put cost and quality pressure on CSAs and contribute to a poor customer experience. Embodiments of the invention discussed herein address these and other problems, individually and collectively.

BRIEF DESCRIPTION OF THE DRAWINGS

Various embodiments in accordance with the present disclosure will be described with reference to the drawings, in which:

FIGS. 5-11 depict exemplary user interface elements provided by the predictive interface engine, in accordance with at least one embodiment;

DETAILED DESCRIPTION

Figure 1:
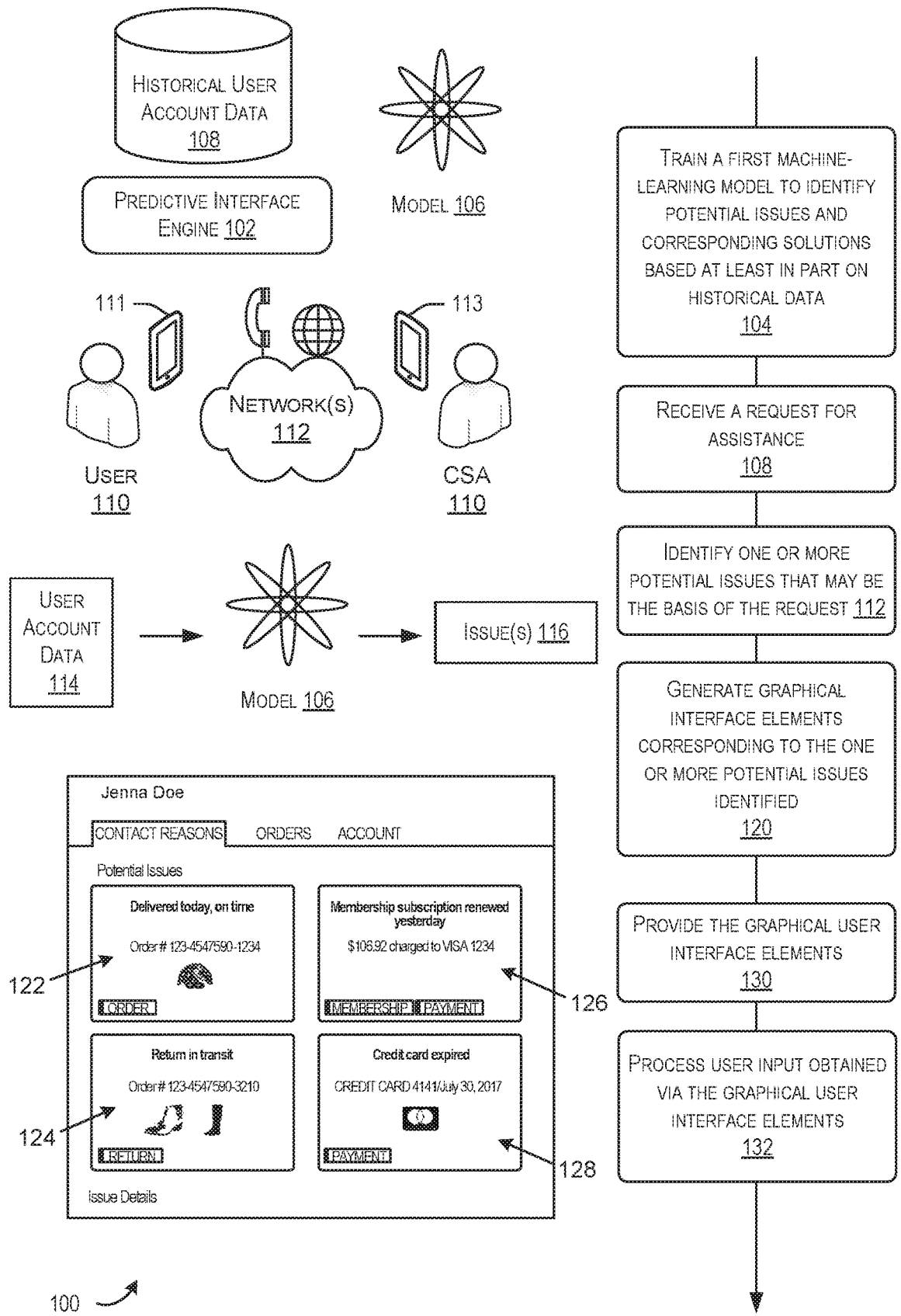
FIG. 1 illustrates an example flow for providing predictive interface elements utilizing a predictive interface engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a predictive interface engine that may be utilized to provide interface elements (e.g., graphical user interface elements) that may be predictive of an issue experienced by a user (e.g., a customer) based on limited available information (e.g., historical and contextual information associated with the user and/or similar users). An "interface element" may include graphical user interface elements such as windows, menus, buttons, edit boxes, selectable options, text, or any suitable component that may be provided via an interface. Although the examples herein may refer to "interface elements," it should be appreciated that every example herein can likewise be applied to "graphical user interface elements." The term "predictive interface element" is intended to include interface elements that were generated and/or presented as a result of determining that the information provided with the interface element is relatively likely to be related to a problem experienced by a user. In some embodiments, the predictive interface engine discussed herein may be executed by a service provider of an electronic catalog (e.g., an online marketplace where goods and services are offered, bought and/or sold). In some embodiments, the predictive interface engine may operate as part of a service center provided by a service provider to which users (e.g., customers of the service provider or another entity) may direct communications (e.g., phone calls, emails, etc.). Some input that may be provided may relate to an item offered in an online electronic catalog and/or an item associated with a user account corresponding to the online electronic catalog.

According to some embodiments, a user (e.g., a customer of a service provider such as an online retailer) may contact a customer service agent via telephone or other suitable communication service. As used herein, a "customer service agent" (CSA) may be a human operator that provides customer service on behalf of a service provider. During the call, the user may be required to authenticate himself. By way of example, the user may be required to provide any suitable combination of a name, address, phone number, postal code, username and/or password, a telephone password, an answer to a security question, or the like. The predictive interface engine may utilize the authentication data to retrieve user account data associated with the user's account. User account data may include order history (e.g., past purchases and/or return/substitutions), subscription history (e.g., indicating data associated with memberships and/or subscriptions), clickstream data (e.g., indicating historical websites visited by the user, actions taken by the user such as adding an item to a shopping cart or any suitable action taken by the user navigational or otherwise), payment data (e.g., data related to one or more forms of payment such as debit/credit cards and/or bank accounts), transcription data (e.g., transcriptions of past customer service interactions), and the like.

Prior to this contact, the predictive interface engine may train a machine-learning model to identify one or more issues likely being experienced by the user (e.g., corresponding to issues experienced by users with similar circumstances). The machine-learning model may be trained using historical user account data corresponding to one or more previous users. The historical user account data may be utilized as a training data set. Each data instance in the training data set may be annotated with one or more issues and one or more resolutions (e.g., actions taken to resolve the issue). The machine-learning model may be trained using the training data set and any suitable machine-learning techniques such as supervised learning techniques, regression analysis, classification algorithms, and the like. Once trained, the machine-learning model may be configured to identify one or more issues and/or one or more corresponding resolutions based at least in part on subsequent (e.g., novel) user account data. In some embodiments, separate machine-learning models may be trained, one to identify issues from input user account data, and a separate model to identify resolutions from input issues and user account data.

Once a caller's user account data is retrieved after authentication, the user account data may be provided to the previously trained model(s) to dynamically identify one or more issues likely being experienced by the user. The identified issues may be ranked. In some embodiments, the ranking may be according to a predetermined ranking scheme. Each issue may be related to an entity. An entity can be an item, a subscription, a membership, an offer, a recall, a service, a program, or any suitable physical or digital object that a customer can or may possess and/or be associated with. By way of example, an entity may be a shipped item expected to be delivered by a particular date a corresponding issue is that the shipped item hasn't arrived on time. In some embodiments, the ranking of issues may be based on any suitable factors such as a timestamp of an event (e.g., a purchase order, a return order, a recall of an item, a shipment, a website visited, payment card expiration, etc.) corresponding to the entity associated with the identified issue, a type or category associated with the entity, or the like. By way of example, user account data that indicates an event (e.g., a purchase) that is more recent than another event (e.g., an older purchase) may be assigned a higher ranking than the ranking provided to the older event. As another example, the ranking scheme may specify that events corresponding to payments and/or purchases are to be prioritized over other types of events such as subscription related events, recall events, and the like. Events older than 5 days may be receive a lower ranking or removed altogether from the set of issues identified by the machine-learning model. Similarly, events that do not relate to transactions may receive a lower ranking or removed altogether from the set of issues identified by the machine-learning model. The particular rules provided in the ranking scheme may be numerous and varied depending on the context in which they are used.

Once ranked, at least some of the ranked issues may be presented within interface elements presented at a user interface provided by the predictive interface engine. The ranked issues may be ordered according to their rank. In some embodiments, all of the ranked issues may be presented, while in other embodiments, only some of the ranked issues may be presented (e.g., the top five ranked issues). In some embodiments, the interface elements may resemble cards that identify the event and/or entity related to one of the identified issues. Within the examples provided herein, these interface elements that present the event and/or entity associated with an issue may be referred to as "match cards." However, it should be appreciated that the issue, event, and/or entity may be identified using a user interface element that are visually different from the match cards/interface elements described herein. In some embodiments, one or more categories associated with the event and/or entity may also be included within the match card. Each of these match cards may be selectable by the user.

In some embodiments, the machine-learning model (or another trained model) may be utilized to identify resolutions corresponding to the likely issues. When a user selects a match card, the predictive interface engine may be configured to present another interface element which may be referred to as a "solve card." A solve card may include any suitable information that may be useful in providing a resolution to the issue corresponding to the selected match card. By way of example, a solve card can include any suitable user account data of the user, predetermined help guides and/or policy statements, details corresponding with one or more events associated with the selected issue, usage metrics corresponding to a subscription, membership data, item details, one or more categories associated with the event(s), or any suitable data.

In some embodiments, a number of actions may be accessible via the solve card. The particular actions available may correspond to the one or more resolutions identified. For example, a potential resolution corresponding to a declined payment may be to update payment data associated with the user's account. Another potential resolution corresponding to a product recall may be to initiate a return shipment for the recalled item. Each solve card can include any suitable number of interface elements (e.g., radio buttons, check boxes, menus, buttons, or the like) corresponding to potential resolutions. The CSA may select any suitable resolution to take action to resolve the issue corresponding to the selected match card. Once resolved, the CSA can similarly resolve other issues through selecting other match cards and proceeding with an action which can be initiated by via a corresponding solve card.

The selected issues and corresponding actions taken during the call may be maintained in a record. At any suitable time, the CSA may select an option to generate a summary correspondence (e.g., an email, a letter, etc.) that summarizes the issues identified and the actions taken during the call. In some embodiments, the summary correspondence may be generated using the record and predefined textual templates such that the text of the correspondence may be generated to provide an accurate description of the issues identified and the actions taken during the call.

By utilizing the techniques provided herein, the CSA may more readily access the data they require to address the issue. By presenting these predictive interface elements (e.g., match cards, solve cards, etc.), the likely relevant data is presented to the CSA without requiring a search to be conducted by the CSA. This can dramatically shorten the length of time required to resolve the issue which can provide the user (e.g., the customer) with an improved experience. Additionally, by alleviating the CSA from having to perform various searches, the efficiency of the system as a whole is improved. New CSAs may also become proficient with the system faster than would be the case with convention systems that do not predict and present likely issues to the CSA.

Moving on to FIG. 1 which illustrates a flow 100 for providing predictive interface elements utilizing a predictive interface engine 102, in accordance with at least one embodiment.

The flow 100 may begin at 104, where the predictive interface engine 102 may train a machine-learning model (e.g., model 106) to identify a number of issues likely being experienced by a subsequent user. In some embodiments, the model 106 may be trained utilizing a training set including historical user account data (e.g., purchase history, browsing history, search history, reviews, comments, posts, orders, purchases, returns, shopping cart history, payment data, transcription data associated with customer service interactions, product recalls, service reminders, shipments, memberships, subscriptions, and the like) for many previous users. In some embodiments, each instance of historical user account data (e.g., a single instance of historical user account data corresponding to a user) may have been previously labeled as being related to one or more issues. In some embodiments, each issue may be labeled as being associated with one or more resolutions (e.g., one or more actions taken to resolve the issue). The model 106 may be trained utilizing any suitable machine-learning techniques (e.g., supervised learning techniques, regression analysis, classification algorithms, etc.). The model 106 may utilize a number of signals learned during the training phase to determine relationships between those signals and one or more issues (and in some cases corresponding resolutions). Although one model is depicted, it should be appreciated that more than one model may be trained and utilized. By way of example, model 106 may be trained to identify issues that are likely being experienced by a user, while a separate model (not depicted) may be trained from historical user account data, corresponding interaction information (e.g., indicating actions taken by a CSA), and corresponding resolution indicators indicating that the particular action(s) resolved or did not resolve the corresponding issue. This separate model, if used, can also be trained utilizing the same or different machine-learning techniques (e.g., supervised learning techniques, regression analysis, classification algorithms, etc.) as those used to train model 106.

At 108, a request for assistance may be received from a user device 111 of the user 110 (e.g., a customer of an online retailer). The request may be in any suitable form and may be received via the network(s) 112. The network(s) 112 may be any suitable communications network such as a telecommunications network, the Internet, an intranet, or the like. As a non-limiting example, the request for assistance may include a phone call initiated by the user 110 utilizing the user device 111.

At 114, one or more issues (e.g., issues that the user is likely experiencing) that may be the basis of the request may be identified. In some embodiments, the user 110 may be required during the phone call to identify themselves and/or their account. The user 110 can be authenticated via any suitable process such as by providing a name, address, phone number, account number, username, password, pin number, and the like. Once authenticated, user account data 114 associated with the user 110 may be retrieved. Once retrieved, the user account data 114 may be provided to the model 106 to identify one or more potential reasons for the call. For example, the model 106 may identify that the user 110 may likely be experiencing issue(s) 116. One issue included in issue(s) 116 may indicate the user 110 may be experiencing an issue regarding a delayed shipment. This determination may be in part, based on identifying that a recent order's shipment date is older than the current date. As another example, issue(s) 116 may additionally or alternatively identify that the user 110 may be likely be experiencing a payment issue due to an expired credit card. This likely issue may be identified based at least in part on the model 106 identifying that the clickstream data included in the user account data indicates the user 110 attempted a purchase 20 minutes earlier and the purchase was declined and/or identifying that the payment data associated with the user 110 is invalid/expired. In some embodiments, the request (e.g., the phone call) may be routed to a user device 113 associated with any suitable customer service agent (e.g., CSA 118). In other embodiments, the CSA 118 may be trained in a particular subject area and the request can be routed to the CSA 118 in particular based at least in part on the issue(s) 116 identified by the model 106 (e.g., where at least one of the issue(s) 116 corresponds to the subject area in which CSA 118 has been trained).

At 120, one or more graphical user interface (GUI) elements may be generated corresponding to the issue(s) 116 (or at least some of issue(s) 116). For example, GUI elements 122-128 may be generated. Each GUI element may be in any suitable form and may be configured to present any suitable data related to the likely issue, an event associated with the likely issue, a category associated with the event and/or likely issue, or the like. In some embodiments, GUI elements 122-128 may correspond to each of the issue(s) 116 identified. In other embodiments, the GUI elements 122-128 may be a subset of the issue(s) 116 identified by the model 106.

At 130, the GUI elements 122-128 may be provided (e.g., at a display of the user device 113 associated with the CSA 118). The GUI elements 122-128 may be presented in any suitable order or the GUI elements 122-128 may be ranked according to a predetermined ranking scheme. If ranked, the higher ranked GUI elements may be provided in a more prominent position. For example, a highest ranked GUI element (e.g., GUI element 122) may be positioned in a top-most, left-most item position with lower ranked GUI elements being positioned in decreasing ranked order according to a left to right, top to bottom, positional scheme. Although in some embodiments, the particular positioning/ordering scheme used to present the GUI elements 122-128 may position the GUI elements 122-128 differently.

At 132, user input obtained via the graphical user interface elements may be processed by the predictive interface engine 102. In some embodiments, the user input may indicate a selection of a particular GUI element. In some embodiments, this user input may cause the predictive interface engine 102 to provide additional GUI elements. Some examples of these additional GUI elements may be discussed below with respect to FIGS. 5-11.

Although FIG. 1 depicts issue(s) 116 as being identified by the model 106, it should be appreciated that, in some embodiments, a predetermined issue identification rule set may additionally or alternatively be utilized to identify any suitable number of issue(s) 116 based at least in part on user account data. By way of example, this predetermined issue identification rule set may specify that any event (e.g., a purchase order, a subscription order, etc.) that occurred on a same day as the request, may be identified as a likely issue. As another example, the predetermined issue identification rule set may specify that expired payment data may pose a likely issue. As yet another example, the predetermined issue identification rule set may specify that a likely issue is to be identified for every event occurring in the last 5 days.

Figure 2:
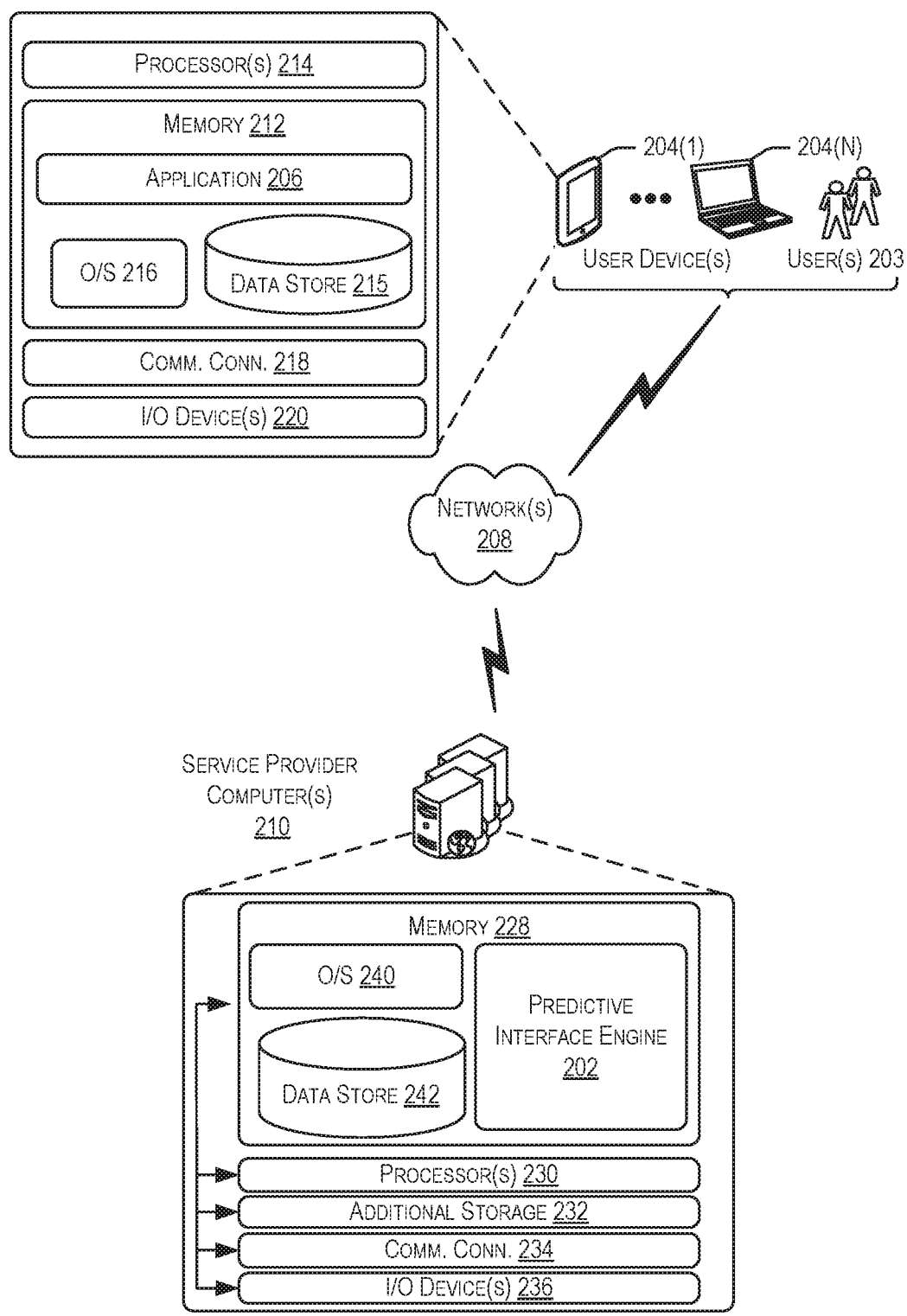
FIG. 2 illustrates components of an example customer service system, in accordance with at least one embodiment.

FIG. 2 illustrates components of a customer service system 200, in accordance with at least one embodiment. In customer service system 200, one or more user(s) 203 may utilize a user device (e.g., a user device of a collection of user device(s) 204 to provide input to the service provider computer(s) 210. The user(s) 203 may each be an example of the users 110 and CSA 118 of FIG. 1. The user device(s) 204 may individually be an example of the user devices 111 and 113 of FIG. 1. In some embodiments, a user may access any suitable input/output devices (e.g., I/O devices 220 discussed below) such as a keyboard, a mouse, a microphone, and the like, to provide input (e.g., via an application 206 running on the user device(s) 204) to service provider computer(s) 210 via one or more network(s) 208. The network(s) 208 may be an example of the network(s) 112 of FIG. 1. By way of example, the input may include selection input (e.g., provided via a touch device and/or mouse), textual data (e.g., provided via a touch device and/or keyboard), audible input (e.g., vocally provided by the user and received via a microphone of the user device), and/or the like. In some embodiments, the user device(s) 204 may be configured with any suitable speech recognition algorithms to convert audible input to text. In some aspects, the application 206 (e.g., a customer service application) operating on the user device(s) 204 may be hosted, managed, and/or provided by a computing service or service provider, such as by utilizing one or more service provider computer(s) 210. The user device(s) 204 may each be an example of the user device In some examples, the network(s) 208 may include any one or a combination of many different types of networks, such as cable networks, the Internet, wireless networks, cellular networks, and other private and/or public networks. While the illustrated example represents the user(s) 203 accessing application functionality over the network(s) 208, the described techniques may equally apply in instances where the user(s) 203 interact with the service provider computer(s) 210 via the one or more user device(s) 204 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the predictive interface engine 202 (an example of the predictive interface engine 102 of FIG. 1), discussed further below in more detail, may operate in whole or in part on the user device(s) 204. Thus, in some embodiments, the user(s) 203 may access the functionality of the predictive interface engine 202 directly through the user device(s) 204 and/or the service provider computer(s) 210 via user interfaces provided by the predictive interface engine 202. In some embodiments, the functionality of the predictive interface engine 202 may be provided as a software service with which input may be submitted and output may be received.

In some embodiments, the application 206 may allow the user(s) 203 (e.g., CSAs) to interact with the service provider computer(s) 210 so as to provide the various functionality described above with respect to the predictive interface engine 202. For example, the application 206 may be utilized to provide user input to the service provider computer(s) 210. In some embodiments, the application 206 (e.g., a web browser application, a customer service application, etc.) may be configured to transmit (electronically convey) the user's input(s) and/or some portion of the user's input(s) to the predictive interface engine 202, operating at the user device(s) 204 and/or the service provider computer(s) 210. The application 206 may further be configured to receive, process, and/or present (via a display or another suitable output device) any suitable data received from the service provider computer(s) 210.

The service provider computer(s) 210, perhaps arranged in a cluster of servers or as a server farm, may host the application 206 operating on the user device(s) 204 and/or cloud-based software services. Other server architectures may also be used to host the application 206 and/or cloud-based software services. The application 206 operating on the user device(s) 204 may be capable of handling requests from the user(s) 203 and serving, in response, various user interfaces and/or output that can be presented at the user device(s) 204. In some embodiments, the application 206 operating on the user device(s) 204 can present any suitable type of website that supports user interaction. The described techniques can similarly be implemented outside of the application 206, such as with other applications running on the user device(s) 204.

The user device(s) 204 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 204 may be in communication with the service provider computer(s) 210 via the network(s) 208, or via other network connections.

In one illustrative configuration, the user device(s) 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user device(s) 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system 216, one or more data stores 215, and one or more application programs, modules, or services for implementing the features of the predictive interface engine 202 disclosed herein, provided via the application 206 (e.g., a browser application, a customer service application, etc.). The application 206 may be configured to receive, store, and/or display a network page or other interface for interacting with the service provider computer(s) 210. In some embodiments, the application 206 may be configured to present user options and/or receive user input textually and/or audibly. In some embodiments, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 204 may also contain communications connection(s) 218 that allow the user device(s) 204 to communicate with a stored database, another computing device (e.g., another of the user device(s) 204) or server device (e.g., the service provider computer(s) 210), user terminals and/or other devices on the network(s) 208. The user device(s) 204 may also include I/O device(s) 220, such as a keyboard, a mouse, a pen, a voice input device (e.g., a microphone), a touch input device, a display, speakers, a printer, etc.

In some aspects, the service provider computer(s) 210 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 210 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 210 may be in communication with the user device(s) 204 and/or other service providers via the network(s) 208 or via other network connections. The service provider computer(s) 210 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 210 may include at least one memory 228 and one or more processing units (or processor(s)) 230. The processor(s) 230 may be implemented as appropriate in hardware, computer-executable instructions, firmware, or combinations thereof. Computer-executable instruction or firmware implementations of the processor(s) 230 may include computer-executable or machine-executable instructions written in any suitable programming language to perform the various functions described.

The memory 228 may store program instructions that are loadable and executable on the processor(s) 230, as well as data generated during the execution of these programs. Depending on the configuration and type of service provider computer(s) 210, the memory 228 may be volatile (such as RAM) and/or non-volatile (such as ROM, flash memory, etc.). The service provider computer(s) 210 or servers may also include additional storage 232, which may include removable storage and/or non-removable storage. The additional storage 232 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 228 may include multiple different types of memory, such as SRAM, DRAM, or ROM.

The memory 228, the additional storage 232, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 228 and the additional storage 232 are all examples of computer storage media. Additional types of computer storage media that may be present in the service provider computer(s) 2210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 210 may also contain communications connection(s) 234 that allow the service provider computer(s) 210 to communicate with a stored database, another computing device or server, user terminals and/or other devices on the network(s) 208. The service provider computer(s) 210 may also include I/O device(s) 236, such as a keyboard, a mouse, a pen, a voice input device, a touch input device, a display, speakers, a printer, etc.

Turning to the contents of the memory 228 in more detail, the memory 228 may include an operating system 240, one or more data stores 242, and/or one or more application programs, modules, or services for implementing the features disclosed herein, such as the features provided by the predictive interface engine 202.

Figure 3:
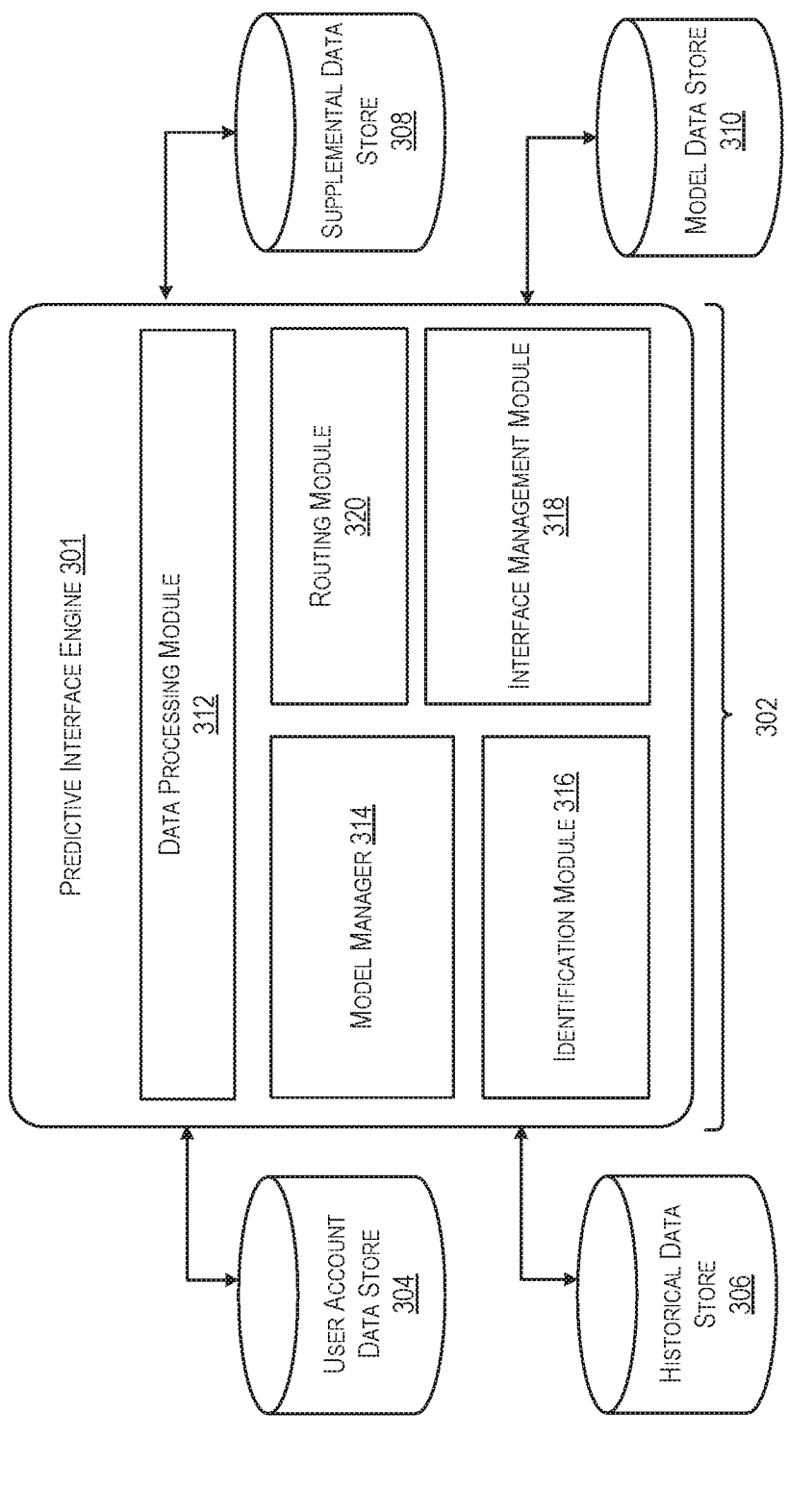
FIG. 3 is a schematic diagram of an example computer architecture for the predictive interface engine, including a plurality of modules that may perform functions in accordance with at least one embodiment.

FIG. 3 is a schematic diagram of an example computer architecture 300 for a predictive interface engine 301 (e.g., an example of the predictive interface engine 102 and 202 of FIGS. 1 and 2, respectively), including a plurality of modules 302 that may perform functions in accordance with at least one embodiment. The modules 302 may be software modules, hardware modules, or a combination thereof. If the modules 302 are software modules, the modules 302 can be embodied on a computer readable medium and processed by a processor in any of the computer systems described herein. It should be noted that any module or data store described herein, may be, in some embodiments, be a service responsible for managing data of the type required to make corresponding calculations. The modules 302, or some portion of the modules 302, may be operate at the service provider computer(s) 210 of FIG. 2, or the modules may operate as separate modules or services external to the service provider computer(s) 210 (e.g., as part of the application 206 of FIG. 2 operating on the user device(s) 204 of FIG. 2).

In the embodiment shown in the FIG. 3, a user account data store 304, a historical data store 306, a supplemental data store 308, and a model data store 310 are shown, although data can be maintained, derived, or otherwise accessed from various data stores, either remote or local to the predictive interface engine 301, to achieve the functions described herein. In at least one embodiment, the data stores described herein may be physically located on the user device(s) 204 or alternatively, any suitable combination of the data stores may be operated as part of the service provider computer(s) 210, for example, as part of the predictive interface engine 301. The predictive interface engine 301, as shown in FIG. 3, includes various modules such as a data processing module 312, a model manager 314, an identification module 316, an interface management module 318, and a routing module 320 are shown. Some functions of the modules 302 are described below. However, for the benefit of the reader, a brief, non-limiting description of each of the modules is provided in the following paragraphs. In accordance with at least one embodiment, a process is identifying potential feature combinations for a new item.

In at least one embodiment, the predictive interface engine 301 includes the data processing module 312. Generally, the data processing module 312 may be utilized to receive and/or transmit any suitable information with respect to any example provided herein. The data processing module 312 may include any suitable number of application programming interfaces (APIs) with which the functionality of the predictive interface engine 301 may be invoked. In some embodiments, the data processing module 312 may be configured to receive user input and execute one or more function calls and/or transmit one or more messages utilizing an API in response to the user input. For example, the data processing module 312 may be configured to execute a particular function call or transmit a message utilizing a particular API in response to receiving user input indicating that an action has been selected and/or corresponding action data has been provided by the user.

In some embodiments, the data processing module 312 may be configured to receive a training data set. The training data set may include historical user account data. Historical user account data may include purchase history, browsing history, search history, reviews, comments, posts, orders, purchases, returns, shopping cart history, payment data, transcription data associated with customer service interactions, product recalls, service reminders, shipments, memberships, subscriptions, and the like, associated with any suitable number of user accounts. In the training data set, each instance of historical user account data may be annotated as corresponding to one or more issues and/or one or more resolutions (or resolution actions such as actions that have been historically taken to resolve the issue) corresponding to each issue. The data processing module 312 may be configured to store the training data sets in historical data store 306.

In some embodiments, the data processing module 312 may act as a proxy module configured to interact with the other modules of the predictive interface engine 301. It should be appreciated that, in some embodiments, the model manager 314, identification module 316, the interface management module 318, and/or the routing module 320 may be implemented as a service or as part of another device separate from the data processing module 312. Accordingly, the data processing module 312 may act as a uniform interface from which the functionality of the other modules may be invoked.

The predictive interface engine 301 may include a model manager 314. The functionality of the model manager 314 may be invoked by the data processing module 312. For example, upon receiving training data or at another suitable time, the data processing module 312 may invoke (e.g., execute a function call to invoke) the functionality of model manager 314.

In some embodiments, the model manager 314 may be configured to train and/or maintain one or more models (e.g., the model 106 of FIG. 1). In some embodiments, at least one model trained by the model manager 314 may be trained to identify issues that are likely being experienced by a user. To train the model (or models), the model manager 314 may obtain the training data set from the historical data store 306. The model manager 314 may execute any suitable supervised machine-learning technique, regression analysis, and/or classification algorithm to train the model using the training data set. A supervised machine-learning technique is intended to refer to any suitable machine-learning algorithm that maps an input to an output based on example input-output pairs. A supervised learning algorithm (e.g., decision trees, artificial neural networks, distance functions such as nearest neighbor functions, regression analysis, etc.) may analyze the training data and produce an inferred function (also referred to as "a model"), which can be used identifying an output (e.g., one or more issues likely being experienced by a user) for a subsequent input (e.g., the user account data associated with that user).

At any suitable time, any suitable number of instances of historical user account data from the training data set may be provided to the model and a number of issues may be identified. The model manager 314 may compare the issues identified by the model to those provided in the training data set to evaluate the accuracy of the personalization model. In some embodiments, this evaluation procedure may occur at any suitable time as new training data is generated. That is, over time, the model may be utilized to identify issues that are likely being experienced by a user given the user's current user account data. The user's account data and the issues identified by the model may be added to the training data set and the model may be retrained and/or incrementally updated over time to produce increasingly accurate predictions of the issues likely experienced by a given user.

In some embodiments, the model may also be trained to identify one or more resolutions (e.g., resolutions actions such as actions that have been historically taken to resolve the issue) for each of the issues identified. It should be appreciated that a separate model may be utilized and trained to identify one or more resolutions for a given issue. That is a first model may be trained to identify one or more issues likely being experienced by a user from an instance of user account data, while a second may be trained to utilize the identified issues as input to identify one or more corresponding resolutions.

In some embodiments, the model manager 314 may be configured to train another model for identifying likely data and/or types of data that is likely to be pertinent to assessing what resolution to take and/or to performing actions corresponding to the resolution. By way of example, the training data set (or another training data set stored in the historical data store 306) may include user account data, one or more issues identified as corresponding to the user account data, one or more resolutions corresponding to each issue, a list of data types corresponding to data that was deemed pertinent to bringing about the resolution of the issue, or any suitable combination of the above. In some embodiments, the list of data types may correspond to data with which users (e.g., CSAs) previously interacted. By way of example, some data may be provided in a graphical user interface element in a collapsed form (e.g., where a header identifying a type of data is presented, but the data corresponding to the header is initially hidden). Past users may have selected an interface option (e.g., an icon, a button, a checkbox, etc.) that expands the data corresponding to the header such that the previously hidden data becomes visible (e.g., under the header). In some embodiments, the list of data types corresponding to the issue that were deemed pertinent may include any data and/or data types that a user expanded in order to view previously hidden data. These option selections may be utilized as a signal to differentiate relevant data (e.g., data that was seemingly utilized to resolve an issue) from irrelevant data (e.g., data that was unnecessary with respect to resolving the issue).

The model manager 314, utilizing this training data and any suitable supervised, unsupervised, and/or semi-supervised machine-learning algorithms, may be utilized to identify what types of data are likely to be pertinent to bringing about a resolution to a particular issue. As a non-limiting example, this model may be trained to identify that when the issue likely experienced by the user relates to payment expiration, payment data including the expiration date of the user's credit card, may be pertinent to bringing about a resolution (e.g., an update of payment data). As another example, the model may be trained to identify that a likely issue may be that the user is confused as to why he was charged a membership fee, information indicating an event corresponding to signing up for the membership is likely to be pertinent to bringing about a resolution to the issue. Any suitable number of data types may be identified by this model and utilized by other modules of the predictive interface engine 301 to dynamically determine exactly what type of data to present via a user interface to best aid the user in assessing the issue and/or bringing about the resolution to the issue.

In some embodiments, the model (or another model trained by the model manager 314) may identify some data types as being more or less relevant to the issue than other data types. By way of example, a model may be configured to identify the types of data that are likely to be pertinent/relevant to a particular issue as well as corresponding relevancy scores identifying, for example, how likely the data type is relevant to the given issue. In some embodiments, the data types may be presented in expanded form or in collapsed form based at least in part on the relevancy scores. For example, first data corresponding to a highly relevant data type may be presented in expanded form, while second data corresponding to a data type that unlikely to be relevant to the issue at hand may be presented in collapsed form. The relevancy scores determined for each data type may be utilized to determine whether data will be presented at an interface, an order or configuration in which the data may be presented relative to other data of the interface, whether the data will be presented in expanded or collapsed form, or any suitable combination of the above.

The model manager 314 may be configured to execute any suitable quality evaluation procedures to assess the quality of any of the models discussed herein. The model manager 314 may be configured to solicit and/or receive user feedback indicating whether or not a current output (e.g., issues likely being experienced by the user, potential resolutions for those issues, the data presented to assess the issue and/or bring about the resolution) is accurate. If a current output is identified as being accurate, the model manager 314 may cause the output and any corresponding data to be added to the training data set stored in historical data store 306. In some embodiments, the model manager 314 may be configured to retrain and/or update any model described herein utilizing the updated training data set. Any model that is trained, retrained, and/or updated by the model manager 314 may be stored in the model data store 310 for subsequent use. In some embodiments, any user input (e.g., including resolution action selections, the order of users selections, collapsing/expanding data to make data visible/hidden, selection of match cards, etc.) may be utilized to retrain any suitable number of models such that the model(s) may become more accurate at identifying issues, resolutions, relevant data, and/or ranking of issues, resolutions, and/or data over time.

In some embodiments, the data processing module 312 may be configured to receive input data. The input data may correspond to a request for assistance initiated by a user (e.g., the user 110 of FIG. 1). In some embodiments, the input data may include data that may be utilized to identify a user account (e.g., a name, address, phone number, username, password, pin number, etc.). In some embodiments, the input data may be provided from an automated call service as being data provided by a requestor (e.g., user 110) during a phone call. In some embodiments, the request may be received from a user device (e.g., user device 113 of FIG. 1) corresponding to a customer service agent (e.g., the CSA 118 of FIG. 1). The input data may be utilized by the data processing module 312 to retrieve user account data corresponding to the requestor from the user account data store 304. The user account data may include purchase history, browsing history, search history, reviews, comments, posts, orders, purchases, returns, shopping cart history, payment data, transcription data associated with customer service interactions, product recalls, service reminders, shipments, memberships, subscriptions, and the like, associated with the requestor (e.g., user 110).

In some embodiments, the data processing module 612 may invoke the functionality of the identification module 316. The identification module 316 may be configured to receive the input data and/or user account data from the data processing module 612. In some cases, the identification module 316 may obtain the user account data from the user account data store 304 based on the input data provided by the data processing module 312. The identification module 316 may be configured to identify one or more types of data based at least in part on the request. In some embodiments, the identification module 316 may be configured to identify issues likely being experienced by the requestor, one or more resolutions corresponding to those issues and/or one or more data types likely to be pertinent to bringing about each of the one or more resolutions. In some embodiments, the identification module 316 may identify all of this data from a single request or in some embodiments, separate requests for each type of data may be utilized (e.g., a request for issue identification, a request for potential resolutions for one or more issues, and/or a request for data types likely to be pertinent to one or more resolutions).

The identification module 316 may retrieve any suitable model from the model data store 310 based on the request for assistance. In some embodiments, the identification module 316 may retrieve a model (e.g., model 106 of FIG. 1) configured to identify one or more issues that are likely being experienced by the requestor. In some embodiments, that same model may also provide as output a number of resolutions associated with each issue and one or more data types likely to be pertinent to each resolution. The identification module 316 may provide the user account data to the model as input and receive as output one or more issues that are likely being experienced by the requestor, a number of resolutions associated with each issue, and one or more data types likely to be pertinent to each resolution.

In some embodiments, the identification module 316 may utilize a predetermined issue identification rule set to identify one or more issues. In some embodiments, a predetermined issue identification rule set may identify any suitable number of issues based at least in part on user account data. By way of example, a predetermined issue identification rule set may specify that any event (e.g., a purchase order, a subscription order, etc.) that occurred on a same day as the request, may be identified as a likely issue. As another example, a predetermined issue identification rule set may specify that expired payment data may pose a likely issue. As yet another example, the predetermined issue identification rule set may specify that a likely issue is to be identified for every event occurring in the last 5 days. The specific number of rules may vary. In some embodiments, the identification module 316 may maintain a mapping of identified issues to particular resolutions and/or data types known to be pertinent to bringing about the resolution. Accordingly, issues identified by a model and/or by utilizing the predetermined issue identification rules set may be used lookup, from the mapping, suitable resolutions and/or data types of data known to be pertinent to those resolutions.

In some embodiments, the identification module 316 may be configured to rank identified issues and/or identified resolutions according to a predetermined ranking rule set or scheme. With respect to ranking issues, each issue may be related to an entity. An entity can be an item, a subscription, a membership, an offer, a recall, a service, a program, or any suitable physical or digital object that a customer can or may possess. By way of example, an entity may be a shipped item expected to be delivered by a particular date a corresponding issue is that the shipped item hasn't arrived on time. In some embodiments, the predetermined ranking rule set may be utilized to rank issues based on any suitable factors such as a timestamp of an event (e.g., a purchase order, a return order, a recall of an item, a shipment, a website visited, payment card expiration, etc.) corresponding to the entity associated with the identified issue, a type or category associated with the entity, or the like. By way of example, user account data that indicates an event (e.g., a purchase) that is more recent than another event (e.g., an older purchase) may be assigned a higher ranking than the ranking provided to the older event. As another example, the predetermined ranking rule set may specify that events corresponding to payments and/or purchases are to be prioritized over other types of events such as subscription related events, recall events, and the like. Events older than 5 days may be receive a lower ranking or removed altogether from the set of issues identified by the model (or by the predetermined issue identification rule set). Similarly, events that do not relate to transactions may receive a lower ranking or removed altogether from the set of issues identified by the machine-learning model. The particular rules provided in the predetermined ranking rule set may be numerous and varied depending on the context in which they are used.

In some embodiments, the ranking of issues and/or resolutions may be determined utilizing a model trained and maintained by the model manager 314. This model may be trained utilizing a training data set that includes interaction data indicating any suitable selections, interface interactions, or any suitable user input obtained via user interfaces provided in response to previous request for assistance. This training data set may also include the historical user account data utilized to identify which interfaces to present. The model can thus learn over time, which issues and/or resolutions were addressed first in a session (e.g., a customer service call), addressed more often than others, addressed before other issues/resolutions were addressed, and the like. Accordingly, the model can output a priority and/or a ranking for an input set of issues and/or resolutions. Alternatively the issues and/or resolutions may individually be associated with a predetermined category (e.g., orders, recalls, purchase, return, payment, etc.). In some embodiments, the identification module 316 may maintain a predetermined mapping that associates various issue/resolution categories with a priority value. The identification module 316 may utilize this mapping to identify priority values for each issue and/or resolution and assign a rank to each issue and/or resolution according to the priority value.

The interface management module 318 may be configured to generate a number of graphical user interface elements for displaying data corresponding to an issue and/or resolution. In some embodiments, the graphical user interface elements may be referred to as a "match card" when displaying information associated with an issue and a "solve card" when displaying information associated with a resolution. In some embodiments, the interface management module 318 may be configured to retrieve any suitable data to be rendered within one of these graphical user interface elements. For example, the interface management module 318 may be configured to present data in these user interface elements according to a predefined template and/or format. Accordingly, the interface management module 318 may retrieve user account data to be included via the user interface element from the user account data store 304. In some embodiments, the supplemental data store may include any suitable predefined help guides and/or policy statements. The help guides and/or policy statements may be associated with a category and/or issue. In some embodiments, the interface management module 318 may be configured to retrieve a help guide and/or policy statement based on a category associated with an issue and/or a resolution in order to provide the help guide and/or policy statement via one or more user interface elements (e.g., a match card, a solve card, etc.).

In some embodiments, the interface management module 318 may dynamically identify what particular data is to be presented in a given user interface elements based at least in part on a model maintained by the model manager 314. By way of example, the interface management module 318 may provide an issue and/or resolution to a model that is trained to identify pertinent data associated with an issue and/or resolution. In response, the interface management module 318 may receive from the model one or more data types that are identified as being information that is likely to be pertinent to the issue and/or resolution. Based on these data types identified, the interface management module 318 may retrieve user account data, help guides, policy statements, or the like that correspond to the data types identified by the model. As another example, the interface management module 318 may maintain a predefined mapping that indicates particular data types (e.g., user account attributes, help guide types, policy statement types, and the like) that are identified as being pertinent to a given issue and/or resolution. The interface management module 318 may utilize the identified issues and/or resolutions (e.g., received from any suitable module of the predictive interface engine 301) to lookup, from the mapping, the particular data types that are pertinent to each issue and/or resolution. Once identified, the data corresponding to the identified data types may be retrieved and provided via the user interface elements generated by the interface management module 318. In some embodiments, the interface management module 318 may generate code for each user interface element and that code may be transmitted to a user device where the code may be used to render the user interface element (e.g., by an application executing on the user device such as the application 206 of FIG. 2).

In some embodiments, the predictive interface engine 301 may include the routing module 320. The routing module 320 may be configured to maintain a mapping of agent identifiers (e.g., corresponding to customer service agents such as CSA 118 of FIG. 1) to particular issues. In some embodiments, the routing module 320 may be configured to receive a request for assistance (e.g., via the data processing module 312 or directly) from any suitable source (e.g., from a user device such as user device 111 of FIG. 1 or from customer service automated call service). The request for assistance may include any suitable user identifier corresponding to a name, address, phone number, username, password, email, pin, or any suitable identifier for the requestor (e.g., the user 110 of FIG. 1). In some embodiments, the routing module 320 may be configured to retrieve the set of issues identified by the identification module 316. If a set of issues has not yet been identified for the request, the routing module 320 may be configured to invoke the functionality of the identification module 316 in order to have a set of issues identified for the request. Once issued are obtained, the routing module 320 may be configured to utilize the mapping to identify a set of agents skilled in at least one issue (e.g., a highest ranked issue indicating a most likely issue) of the set of issues identified. In some embodiments, the routing module 320 may be configured to route the request to one of the identified agents. A particular agent may be selected from that set based on the respective agents availability (e.g., whether the agent is already assisting another user).

Figure 4:
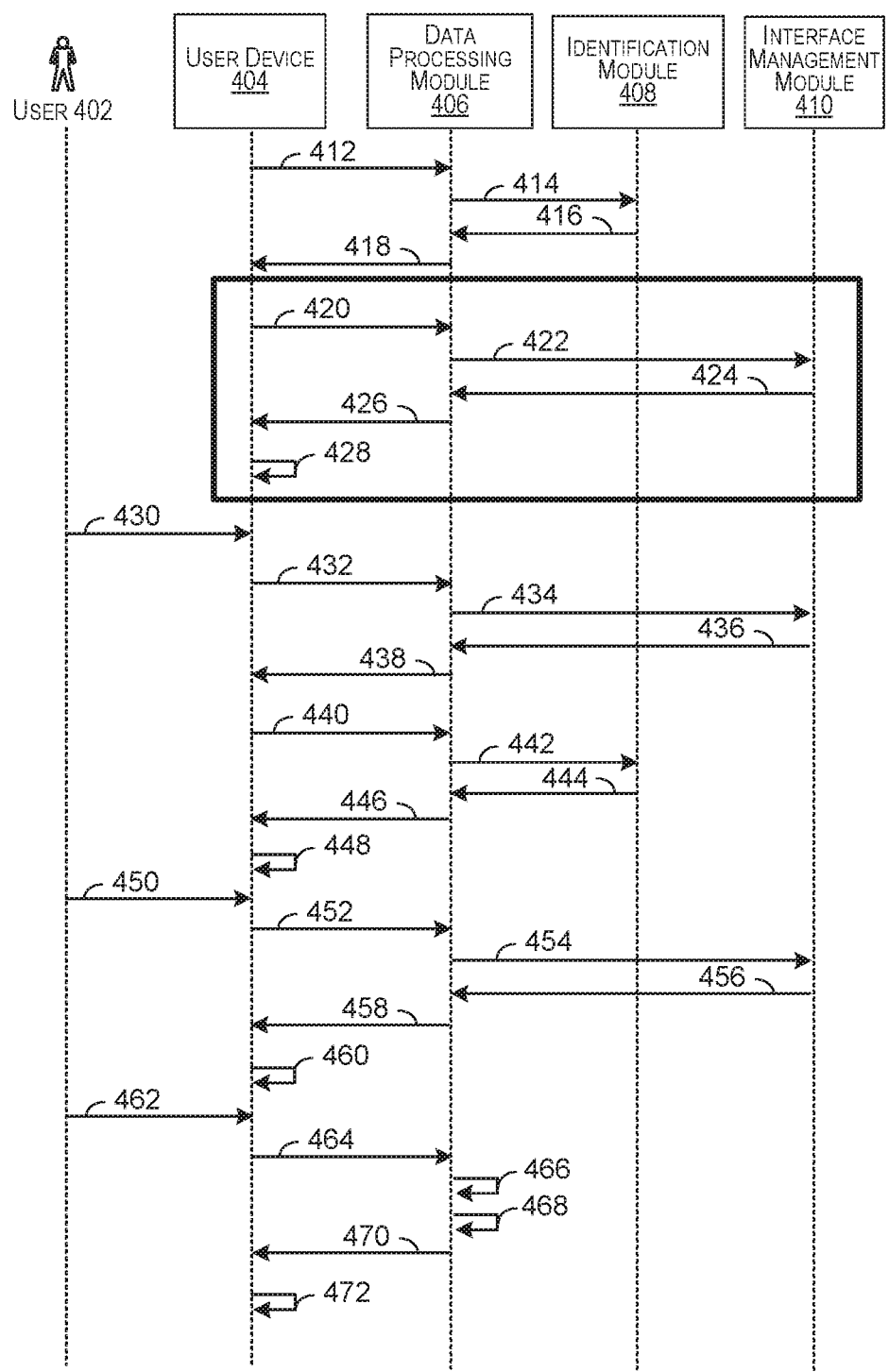
FIG. 4 is a swim lane diagram of an example process for providing predictive interface elements, in accordance with at least one embodiment.

FIG. 4 is a swim lane diagram of an example process 400 for providing predictive user interface elements, in accordance with at least one embodiment. The process 400 may be performed by user 402 (e.g., CSA 118 of FIG. 1), user device 404 (e.g., user device 113 of FIG. 1), and various modules of a predictive interface engine (e.g., the predictive interface engine 301 of FIG. 3) including data processing module 406 (e.g., data processing module 312 of FIG. 3), identification module 408 (e.g., identification module 316 of FIG. 3), and interface management module 410 (e.g., the interface management module 318 of FIG. 3). In some embodiments, the steps performed by user device 404 may be performed by an application executing on the user device 404 (e.g., the application 206 of FIG. 2, a customer service application).

The process 400 may begin at step 412, where the user device 404 (a CSA's device) may transmit a request to identify one or more issues that are likely being experienced by an individual (e.g., a customer calling in to a customer service call center). The request may be received by the data processing module 406. In some embodiments, the data processing module 406 may act as a proxy that may be configured to access one or more other modules and/or services of the predictive interface engine.

At step 414, the data processing module 406 may forward the request to identify one or more issues to the identification module 408.

At step 416, the identification module 408 may utilize a previously-trained machine-learning model (e.g., model 106 of FIG. 1) and/or a predetermined issue identification rules set to identify one or more issues that are likely being experienced by the individual. In some embodiments, the identification module 408 may rank the one or more issues identified using a model previously-trained to identify a ranking for one or more issues. Alternatively, the identification module 408 may utilize a predefined mapping that indicates a priority value for each issue and may rank the issues according to the priority value. The identified issues (and potentially the ranking identified for those issues) may be transmitted back to the data processing module 406.

At step 418, the data processing module 406 may transmit the identified issues (and potentially the ranking identified for those issues) to the user device 404.

At step 420, the user device 404 may request user interface data for a particular user interface corresponding to an issue. As an example, the request may be for data corresponding to a particular "match card." Example match cards will be discussed in connection with FIGS. 5-11. The request for match card data may be received by the data processing module 406.

At step 422, the data processing module 406 may forward the request for match card data to the interface management module 410. The interface management module 410 may utilize a previously-trained machine-learning model (e.g., model 106 of FIG. 1) and/or a predetermined mapping (e.g., a mapping that indicates one or more data types that have been deemed to be pertinent to a given issue) to identify particular data to be presented in the match card. In some embodiments, the interface management module 410 may retrieve this data from any suitable source (e.g., the user account data store 304 of FIG. 3, the supplemental data store 308 of FIG. 3, etc.). The retrieved may be transmitted back to the data processing module 406.

At step 426, the data processing module 406 may transmit the data for the match card to the user device 404.

At step 428, the user device 404 may execute any suitable operations for rendering the match card including the received data via a user interface element rendered by the user device 404. The steps 420-428 may be repeated any suitable number of times depending on the number of issues identified and/or based at least in part on a number of match cards to be displayed. It should be appreciated that the user device 404 may determine that less than all of the match cards are to be displayed (e.g., depending on a display capabilities of the user device 404, depending on a predefined rule). For example, the user device 404 may identify that only the top three issues are to be displayed. Accordingly, steps 420-428 may be executed a number of times corresponding to the number of match cards that are to be displayed rather than a total number of issues identified.

At step 430, the user 402 may utilize the user interface elements provided at the user device 404 to select a match card.

At step 432, the user device 404 may request user interface data (e.g., solve card data) for a particular user interface such as a solve card. A solve card may correspond to a user interface element utilized to display resolution data that corresponds to a selected match card. Example solve cards will be discussed in connection with FIGS. 5-11. The request for solve data may be received by the data processing module 406.

At step 434, the data processing module 406 may forward the request for solve card data to the interface management module 410. The interface management module 410 may utilize a previously-trained machine-learning model (e.g., model 106 of FIG. 1) and/or a predetermined mapping (e.g., a mapping that indicates one or more data types that have been deemed to be pertinent to a given resolution corresponding to the selected issue) to identify particular data to be presented in the solve card. In some embodiments, the interface management module 410 may retrieve this data from any suitable source (e.g., the user account data store 304 of FIG. 3, the supplemental data store 308 of FIG. 3, etc.). The retrieved may be transmitted back to the data processing module 406.

At step 436, the data processing module 406 may transmit the data for the solve card to the user device 404.

At step 438, the user device 404 may execute any suitable operations for rendering the solve card including the received solve card data via a user interface element rendered by the user device 404.

At step 440, the user device 404 (a CSA's device) may transmit a request to identify one or more resolutions actions to present via the solve card. The request may be received by the data processing module 406.

At step 442, the data processing module 406 may forward the request to identify one or more issues to the identification module 408.

At step 444, the identification module 408 may utilize a previously-trained machine-learning model (e.g., model 106 of FIG. 1) and/or a predetermined mapping to identify one or more actions (e.g., initiate a refund, cancel a membership, initiate a return order, cancel an order, initiate a substitute order, update payment data, or the like) associated with one or more resolutions corresponding to the selected issue (the issue corresponding to the selected match card). In some embodiments, the identification module 408 may rank the one or more actions identified using a model previously-trained to identify actions taken most often to resolve the issue. Identification information identifying the actions (or information identifying interface calls corresponding to the actions) may be transmitted to the data processing module 406.

At step 446, the data processing module 406 may forward the received action data to the user device 404.

At step 448, the user device 404 may execute any suitable operations for rendering the solve card including the solve card data and options corresponding to the received action data via a user interface element rendered by the user device 404. The steps 5-9 may be repeated any suitable number of times depending on the number of issues identified and/or based at least in part on a number of match cards to be displayed. It should be appreciated that the user device 404 may determine that less than all of the match cards are to be displayed (e.g., depending on a display capabilities of the user device 404, depending on a predefined rule). For example, the user device 404 may identify that only the top three issues are to be displayed. Accordingly, step 5-9 may be executed a number of times corresponding to the number of match cards that are to be displayed rather than a total number of issues identified.

At step 450, the user 402 may utilize user device 404 to select an action. The user input indicating the selection of the action may be transmitted by the user device 404 to the data processing module 406 at step 452.

At step 454, the data processing module 406 may transmit the user input to the interface management module 410. The interface management module 410 may identify any suitable data and/or interface elements (e.g., radio buttons, edit boxes, text, check boxes, submit buttons or the like) to provide in response to the selection of the action. By way of example, if the action is to manage a subscription, the interface management module 410 may identify a number potential options that may be provided (e.g., initiate monthly payments for the membership, initiate annual payments for the membership, cancel the membership, etc.). Once identified, data corresponding to these options may be transmitted back to the data processing module 406 at step 456, and forwarded to the user device 404 at step 458.

At step 460, the user device 404 may update the solve card to render the additional options corresponding to the action selected.

At step 462, the user 402 may select one of the options presented via the solve card. At step 464, the user input indicating the selection may be transmitted to the data processing module 406. At step 466, the data processing module 406 may execute any suitable function call and/or transmit any suitable message via any suitable application programming interface to cause the execution of the operations corresponding to the selected option. The data processing module 406 may receive some indication that the operations were successfully or unsuccessfully executed.

At step 468, the data processing module 406 may be configured to record the actions taken. In some embodiments, the data processing module 406 may maintain a record of all actions taken during a session (e.g., during a customer service call) and their corresponding outcomes (e.g., success and/or failure).

At step 470, the data processing module 406 may transmit data indicating that the action was successfully and/or unsuccessfully executed.

At step 472, the user device 404 may update the user interface to present the information indicating whether the action was successful or unsuccessful.

FIGS. 5-11 depict exemplary user interfaces including a number of user interface elements as provided by the predictive interface engine, in accordance with at least one embodiment.

Figure 5:
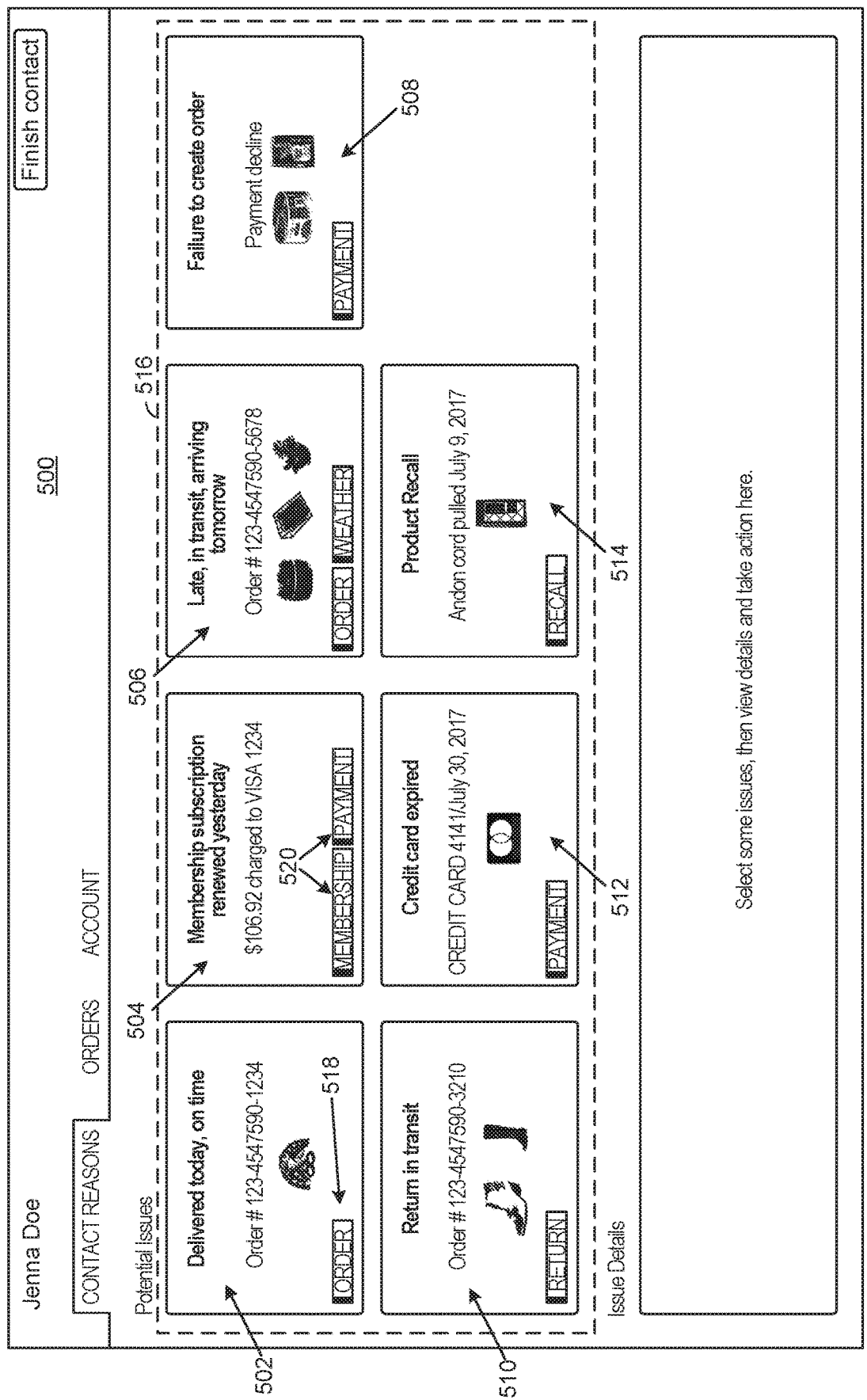

FIG. 5 depicts a user interface (UI) 500 including a number of exemplary match cards (e.g., match cards 502-514), according to at least one embodiment. The UI 500 may be an example of a UI provided by the predictive interface engine 301 of FIG. 1. As discussed above, prior to displaying UI 500, the predictive interface engine 301 may train one or more machine-learning models to identify issues likely being experienced by a user (e.g., a customer calling into a customer service center). The user account data associated with the user may be obtained and provided (e.g., by the identification model) to the machine-learning model(s) (e.g., model 106 of FIG. 1) to identify the one or more issues. The issues identified may be ranked according to any suitable predetermined ranking rule set as discussed herein.

UI 500 includes match cards 502-514 which may individually correspond with an issue identified by the machine-learning model. The match cards 502-514 may collectively correspond to all the issues identified by the machine-learning model or the match cards 502-514 may collectively correspond to a subset of the issues identified by the machine-learning model. As depicted, each match card may include at least some data likely related to the corresponding issue. By way of example, match card 502 may correspond to a delivered item. In the example depicted, match card 502 may depict text indicating that an order was delivered today, and on time, the order number and an previously stored image of the item.

The particular data displayed within each match card may be predefined. In some embodiments, the predictive interface engine (e.g., the interface management module 318) may utilize a predefined mapping that associates the issue (or a category of the issue) corresponding to the match card to a set of data types. The match card may then be presented with the particular data obtained from the user account data associated with the user, the particular data obtained may correspond to one of the data types of the set of data types. In some embodiments, each match card may identify the one or more categories associated with the issue corresponding to the match card. For example, match card 502 may include category label 518, while match card 504 may include category labels 520. The number of categories associated with the issue may vary. In some embodiments, each match card may display all of the categories associated with the issue, while in other embodiments, a subset of the categories associated with the issue may be displayed (e.g., the top two categories associated with the issue). As discussed above, the categories may be associated with priority values. In some embodiments, if multiple categories are presented with a given match card, the categories may be presented based on the priority value associated with each category. For example, a category that has a highest priority value may be listed first followed by a second category with a lower priority value.

In some embodiments, the particular data displayed within the match cards may be dynamically identified. By way of example, the predictive interface engine (e.g., the interface management module 318 of FIG. 3) may utilize a model trained to identify a best set of data to present within a given match card. The model may be trained (e.g., by the model manager 314 of FIG. 3) utilizing a training data set that includes the current user account data associated with the user (e.g., the caller, one or more issues corresponding to the user account data, a one or more sets of data types corresponding to each issue, and labels identifying whether the data types of the set were helpful to identify the issue when provided in a match card. In some embodiments, the training set may be manually labeled based at least in part on user input. For example, at any suitable time the predictive interface engine may present the user (e.g., CSA 118) with an option to indicate whether or not the data provided in the match card was helpful. The CSA's response(s) may be recorded and utilized to train the model such that when a match card is presented, the corresponding issue and user account data may be provided and a set of data types may be returned by the model. The predictive interface engine may then present any suitable data corresponding to the set of data types identified by the model within a given match card.

In some embodiments, the match card 502 may be displayed at a top-most, left-most position in an area (e.g., area 516) of the UI 500 designated for potential (e.g., likely) issues. The top-most, left-most position, in this example, may be reserved for a match card corresponding to a most-likely issue as determined by the rankings of the issues identified by the machine-learning model. By way of example, the model may identify that a most-likely issue experienced by the user could be that the shipment that was delivered today contained a broken item. The model may determine this issue based at least in part on many factors, including, but not limited to the fact that the event (e.g., the delivery notification for the item received from the shipping agent) may be the most recent activity associated with the user account. The match cards 502-514 may be depicted as being positioned in a grid like manner where the ranking of the match cards corresponds to match card 502, 504, 506, 508, 510, 512, and 514, in that order. It should be appreciated that the match cards may be differently positioned and that the ranking may be differently indicated. The particular number of match cards presented in UI 500 is intended to be illustrative only, any suitable number of match cards may be presented. Area 516 may be fixed in size, or area 516 may expand and/or retract (e.g., up to a threshold size) based at least in part on the number of match cards identified and/or to be presented.

Figure 6:
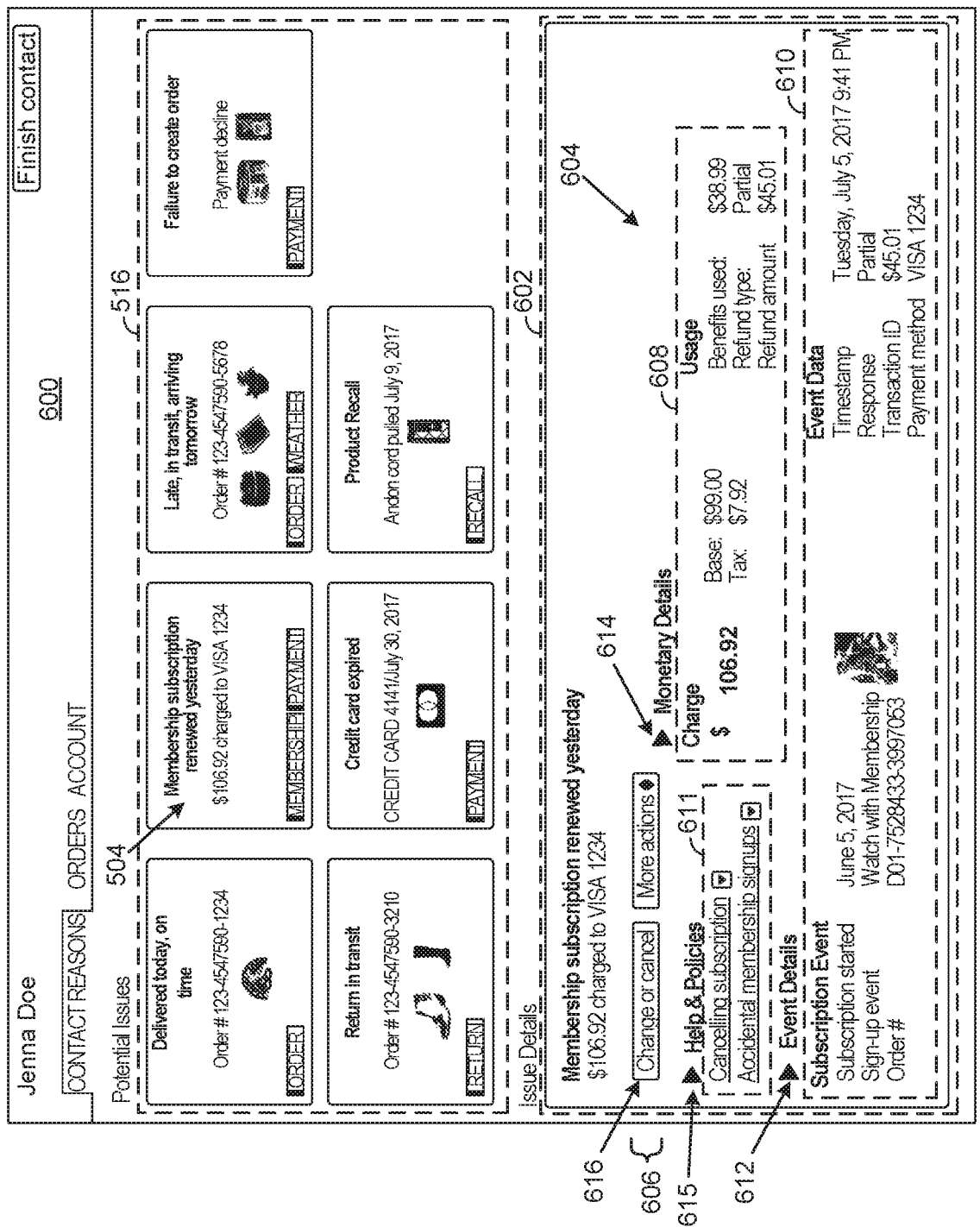

FIG. 6 depicts a user interface (UI) 600 including a number of exemplary match cards (e.g., the match cards 502-514 of FIG. 5), according to at least one embodiment. As depicted in FIG. 5, the match cards 502-514 may be presented within area 516, an area designated for potential issues.

UI 600 depicts a change in the content of the interface once a user (e.g., CSA 118 of FIG. 1) has selected a particular match card. By way of example, the CSA 118 may select match card 504 from the set of match cards displayed in area 516. Upon selecting match card 504, additional data may be presented within area 602, an area configured to display this additional data. By way of example, area 602 may include resolution data 604. Resolution data 604 may include, but is not limited to any suitable portion of user account data associated with the user (e.g., a caller calling into a customer service center), any suitable supplemental data (e.g., hyperlinks to help guides, policy documents, etc.) and/or any suitable resolution options (e.g., resolution options 606, including a change or cancel option and/or one or more actions provided via a drop down menu as depicted).

The particular resolution data 604 displayed upon selection of a match card may vary depending on the match card selected. By way of example, the resolution data 604 may differ from the data that would be displayed should any of the other match cards be selected. In some embodiments, the particular data types of resolution data 604 may be predefined. By way of example, the particular data to be included in resolution data 604 (and, in some cases, the positioning of said data) may be predefined in a template associated with a category corresponding to the issue. In other embodiments, the predictive interface engine (e.g., the interface management module 318) may utilize a predefined mapping that associates the issue (or a category of the issue) corresponding to the match card to a set of data types to be utilized for the resolution data 604. The resolution data 604 may be presented with the particular data obtained from the user account data associated with the user, the particular data obtained may correspond to one of the data types of the set of data types. The template corresponding to the issue of match card 504 may specify the placement of the supplemental data (e.g., hyperlinks to help and policies documents), and user account data (e.g., charge data, usage data, subscription event data, and event data corresponding to the subscription). The template may specify a number of resolution options (e.g., resolution options 606) to provide within the area 602 at a designated position.

In some embodiments, the particular data used for resolution data 604 may be dynamically identified. By way of example, the predictive interface engine (e.g., the interface management module 318 of FIG. 3) may utilize a model trained to identify data likely to be relevant to the issue. The model may be trained (e.g., by the model manager 314 of FIG. 3) utilizing a training data set that includes the current user account data associated with the user (e.g., the caller, one or more issues corresponding to the user account data, a one or more sets of data types corresponding to each issue, an indication that data corresponding to the data was viewed and/or interacted with to some degree in the past (e.g., over a threshold number of times, 75% of past calls related to the issue, etc.), labels identifying whether the data types of the set were helpful in assessing and/or resolving the particular issue, or any suitable combination of the above.

In some embodiments, the training set may be manually labeled based at least in part on user input. For example, at any suitable time the predictive interface engine may present the user (e.g., CSA 118) with an option to indicate whether or not the data provided in the area 602 was helpful. The CSA's response(s) may be recorded and utilized to train the model such that when a match card is selected, the corresponding issue and user account data may be provided and a set of data types may be returned by the model. The predictive interface engine may then present any suitable data corresponding to the set of data types identified by the model within the area 602.

In some embodiments, resolution data 604 may include resolution data 608 (e.g., monetary details data), resolution data 610 (e.g., event details data), and resolution data 611. Resolution data 608, 610, and/or 611 may be identified a predefined rule set (e.g., a resolution rule set indicating a set of data types relevant to a particular type of issue) and/or by utilizing a machine-learning model (e.g., a model trained by model manager 314 of FIG. 3). For example, the particular issue selected (e.g., an issue related to a membership subscription corresponding to match card 504) may be utilized as input to a machine-learning model trained to identify resolution data that is likely to be relevant to a given issue (e.g., the selected issue, an issue related to a membership subscription). The model may be trained utilizing past interaction data indicating past interactions of CSAs with data previously provided in area 602. Thus, the model may identify resolution data 608, 610, and 611 as being relevant to a membership subscription issue based at least in part on past interaction data indicating that previous CSAs often interacted with similar data in past sessions. For example, historical interaction data may indicate that data corresponding to resolution data 608, 610, 611 were often (e.g., over a threshold number of times, over a threshold percentage of past sessions, etc.) made visible by user input. In some embodiments, the model may deem resolution data 608 as being more likely to be relevant to the selected issue than resolution data 610 and resolution data 611 (e.g., perhaps based on identifying that resolution data 608 was expanded/viewed more often than resolution data 610 and resolution data 611). Accordingly, the placement of resolution data 608, 610, 611, relative to the interface and/or to one another, may be determined based on the relative likelihoods that the data is relevant to the selected issue.

As a non-limiting example, in some embodiments, resolution data 608 may be positioned above resolution data 610 based at least in part on determining (e.g., from model output) that resolution data 608 is more likely to be relevant to the selected issue than resolution data 610. As another example, resolution data 608 may be placed to adjacent (e.g., to the right) of resolution data 611 based at least in part on determining that resolution data 608 is more likely to be relevant than resolution data 611, which in turn may be more likely to be relevant than resolution data 610. In some embodiments, resolution data 608 and resolution data 611 may be displayed in expanded form (as depicted) such that the whole of resolution data 608 and 611 is visible to the user upon selection of the match card 504. In some embodiments, resolution data 610 may be initially hidden from view upon selection of the match card 504.

In some embodiments, a user interface option 612 may be selected to expand resolution data 610 (e.g., make the data visible) should the user be interested in viewing event details data. Although resolution data 608 may be initially presented in expanded form, user interface option 614 may be provided. Upon selecting user interface option 614, the resolution data 608 may be collapsed (e.g., hidden from view) where only the header "Monetary Details" is visible to the user. Another selection of user interface element 614 may expand the data such that resolution data 608 may be visible once more. User interface element 615 may be utilized in a similar manner to expand or collapse resolution data 611. Any selection of the user interface options 612, 614, and/or 615 may be utilized as additional training data for the model to further train and/or update the model over time to become more accurate in predicting what data/data types are likely to be relevant to the selected issue.

Selection of the resolution option 616 may cause the predictive interface engine to present the UI 700.

Figure 7:
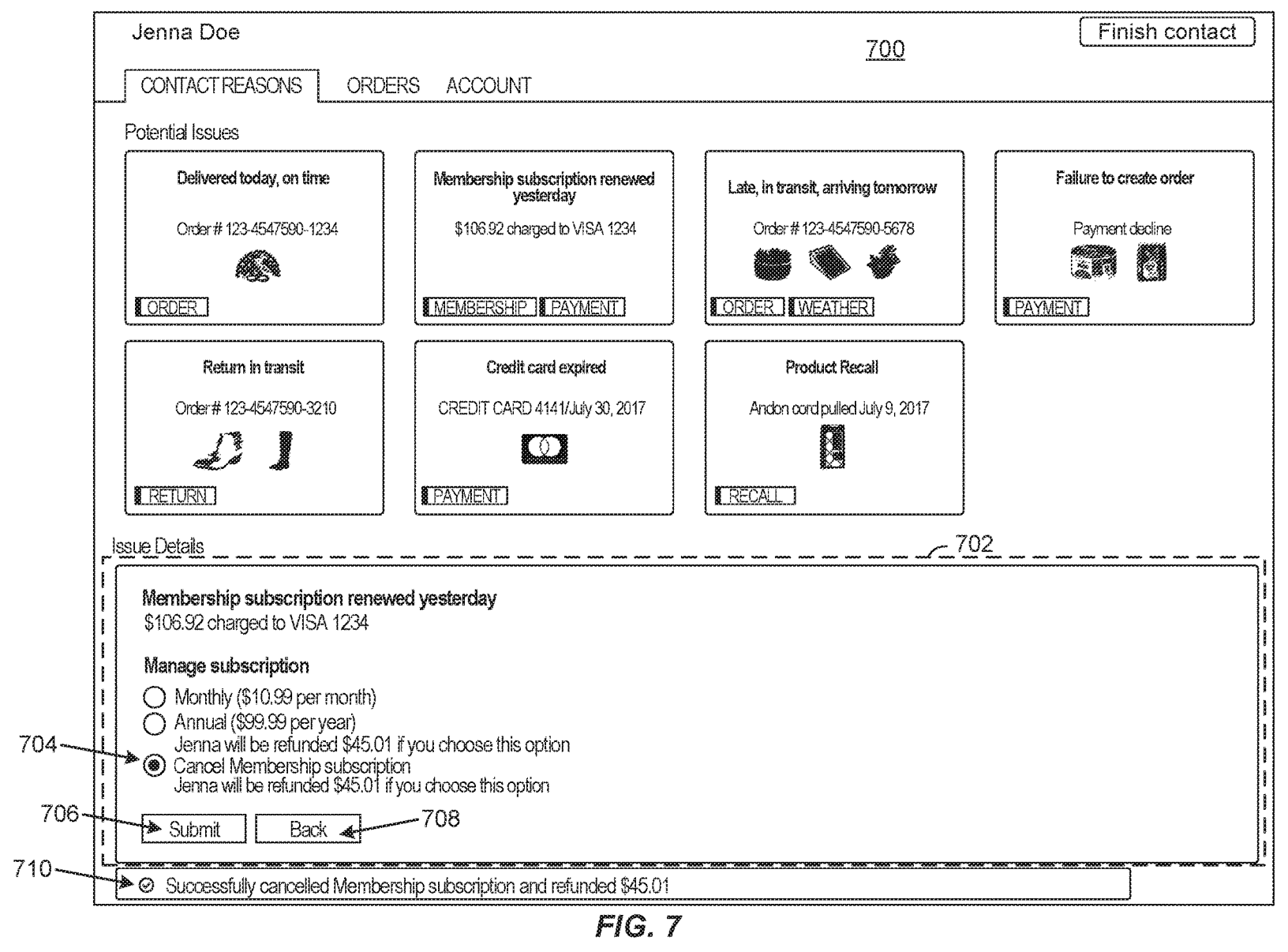

FIG. 7 includes UI 700 that depicts a change in the content of the UI 600 of FIG. 6 once a user (e.g., CSA 118 of FIG. 1) has selected the resolution option 608 of FIG. 6. In UI 700, area 702 (e.g., the area 602 of FIG. 6) may be modified to present options corresponding to a set of resolution actions. These options may be predefined. As a non-limiting example, the options presented in area 702 may include an option to pay for a membership subscription utilizing 12 monthly payments of $10.99 per month, an option to pay for the membership in a single payment of $99.99, and an option to cancel the membership.

In some embodiments, a back button 710 may also be provided within area 702. If the back button 710 is selected (e.g., prior to selecting the option 704 and/or the submit button 706), the user (e.g., the CSA 118) may be navigated back to the UI 600 depicted in FIG. 6.

In some embodiments, each option may correspond to a particular set of actions that may be executed. For example, should the user (e.g., CSA 118 of FIG. 1) selects the option 704 and then selects the submit button 706, a set of operations may be triggered by the predictive interface engine that will cause a membership subscription (e.g., a membership subscription associated with a user calling into a customer service center) to be cancelled. In the example depicted, the operations may also include operations for refunding an amount of a membership subscription fee (e.g., $45.01). In some embodiments, the particular amount refunded may be identified based at least in part on the usage data depicted in FIG. 6.

Subsequent to selecting the submit button 706, the predictive interface engine (e.g., the predictive interface engine 301 of FIG. 3) may receive a status update from a system and/or component responsible for executing the operations associated with option 704. The status update may indicate whether the operations were successful or unsuccessful. In some embodiments, text describing the status update may be displayed at 710. The predictive interface engine may also be configured to record the status update in a record associated with the session (e.g., a session started when the user 110 of FIG. 1 was connected with the CSA 118 of FIG. 1).

Figure 8:
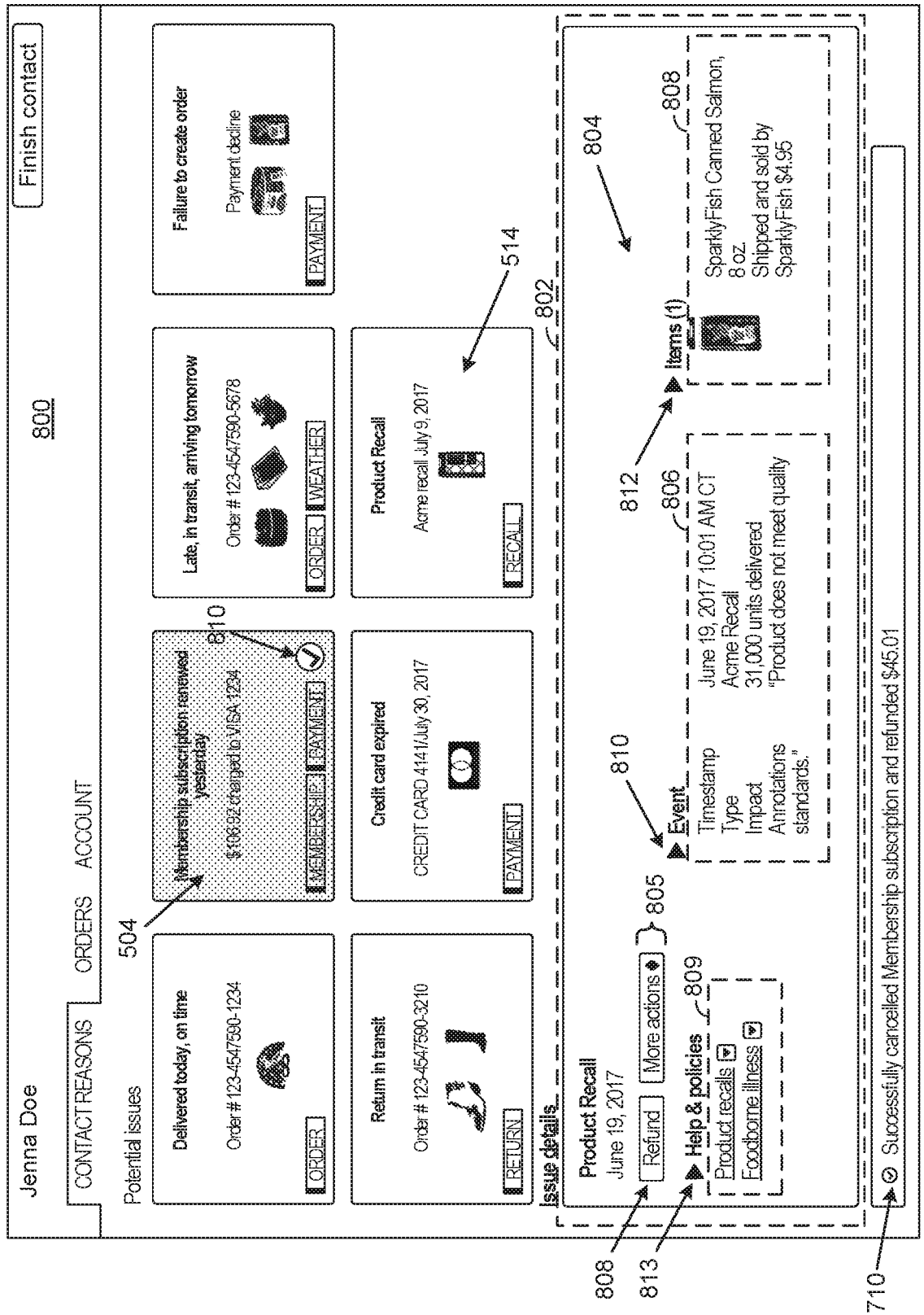

FIG. 8 includes UI 800 that depicts a change in the content of the UI 700 of FIG. 7 once a user (e.g., CSA 118 of FIG. 1) has selected the submit button 706 of FIG. 7 and then selected match card 514.

The match card 504 may be modified after selection of the submit button 706 to indicate the issue corresponding to the match card 504 was resolved. The particular modifications may vary. As depicted in FIG. 8, the match card 504 may be darkened and icon 810 (e.g., a checkmark) may be displayed within the match card 504. Additionally, or alternatively, display of the text describing the status update displayed at 710 of FIG. 7 may persist.

Upon selecting match card 514, additional data may be presented within area 802 (e.g., the area 602 of FIG. 6, the area 702 of FIG. 7), an area configured to display this additional data. By way of example, area 802 may include resolution data 804. Resolution data 804 may include, but is not limited to any suitable portion (e.g., event data, item data, etc.) of user account data associated with the user (e.g., a caller calling into a customer service center such as user 110 of FIG. 1), any suitable supplemental data (e.g., hyperlinks to help guides, policy documents, etc.) and/or any suitable resolution options (e.g., resolution options 805, including in this example, a refund option and/or one or more actions provided in a drop down menu as depicted).

The particular resolution data 804 displayed upon selection of a match card 514 may differ from the resolution data 604 of FIG. 6 displayed when selection of the match card 504 was selected. As discussed above, the particular data types of resolution data 804 may be predefined (e.g., based on a mapping or template maintained by the predictive interface engine 301 of FIG. 3) or a model (e.g., a model trained by the predictive interface engine 301) may be utilized to identify the particular data used for resolution data 804.

In some embodiments, resolution data 804 may include subsets of data such as resolution data 806, resolution data 808, and resolution data 809. As described above in connection with FIG. 6, any suitable portion of resolution data (in this example, resolution data 806 and/or 808 and/or 809) may be identified utilizing a predetermined data type selection rule set (e.g., a rule set that defines/maps a set of data types that are identified as being relevant to a given type of issue) and/or by utilizing a machine-learning model that is trained on historical interaction data (e.g., past user interface option selections and/or user input such provided by CSA indicating particular data as being relevant to a particular issue to some degree, etc.). The resolution data 806, 808, and 809 may be positioned according to the respective likelihoods that the data is relevant to the selected issue (e.g., with data being more likely to be relevant placed to the left of data less likely to be relevant). If a rule set is utilized to identify the resolution data, the rule set may identify a degree of relevancy for each data type such that corresponding resolution data may be positioned and/or displayed according to their respective degree of relevancy. Although resolution data 806, 808, and 809 are depicted in expanded form (e.g., visible to the user), it should be appreciated that any suitable combination of resolution data 806 and/or 808 and/or 809 may be displayed in collapsed form based at least in part on the likelihood (e.g., identified by a rule set or by a model) that the data is relevant to the selected issue. User interface options 810, 812, and 813 are provided to toggle resolution data 806 and 808, respectively, between an expanded view where the data is visible to the user, to a collapsed view where the data is hidden from the user. Any selections of the user interface options 810, 812, and/or 813 may be utilized as additional training data for the model such that the model may become more accurate at predicting relevant data over time. If a data type rule set is utilized to identify relevant data types, any selection of the user interface options 810, 812, and/or 813 may be utilized to adjust the data type rule set to more accurately identify relevant data over time.

Figure 9:
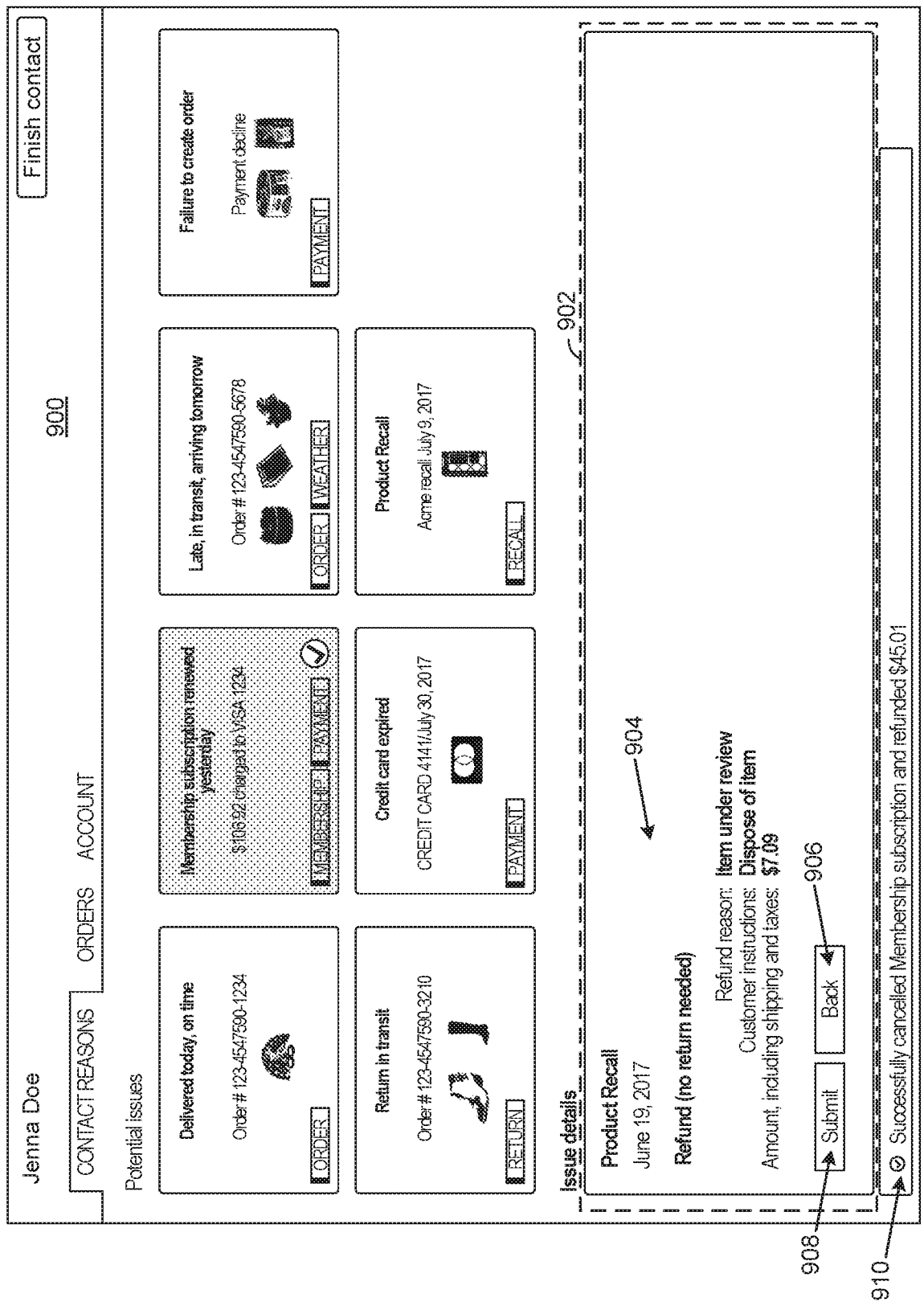

Selection of the resolution option 808 (e.g., corresponding to a refund option) may cause the predictive interface engine to present the UI 900 of FIG. 9.

FIG. 9 includes UI 900 that depicts a change in the content of the UI 800 of FIG. 8 once a user (e.g., CSA 118 of FIG. 1) has selected the resolution option 808 of FIG. 8. In UI 900, area 902 (e.g., the area 802 of FIG. 8) may be modified to present information corresponding to the resolution option 808. As a non-limiting example, the resolution option 808 of FIG. 8 may correspond to a providing a refund. Upon selection of the resolution option 808, data 904 may be provided. As discussed numerous times above, the data 904 may be predefined or the data 904 may be dynamically identified utilizing a model in a similar manner as described above in connection with resolution data 604 and 804 of FIGS. 6 and 8, respectively.

In some embodiments, a back button 906 may also be provided within area 902. If the back button 906 is selected, the user (e.g., the CSA 118) may be navigated back to the UI 800 depicted in FIG. 8.

In some embodiments, should the user (e.g., CSA 118 of FIG. 1) select the submit button 908, a set of operations may be triggered by the predictive interface engine that will cause a refund to be issued. The amount of the refund may correspond to the price and any suitable tax and/or shipping fees associated with purchasing and shipping the item. The amount of the refund may be determined based at least in part on the user account data (e.g., the order including the item).

Subsequent to selecting the submit button 908, the predictive interface engine (e.g., the predictive interface engine 301 of FIG. 3) may receive a status update from a system and/or component responsible for executing the refund operations. The status update may indicate whether the refund operations were successful or unsuccessful. In some embodiments, text describing the status update may be displayed at 910. The predictive interface engine may also be configured to record the status update in a record associated with the session (e.g., a session started when the user 110 of FIG. 1 was connected with the CSA 118 of FIG. 1).

Figure 10:
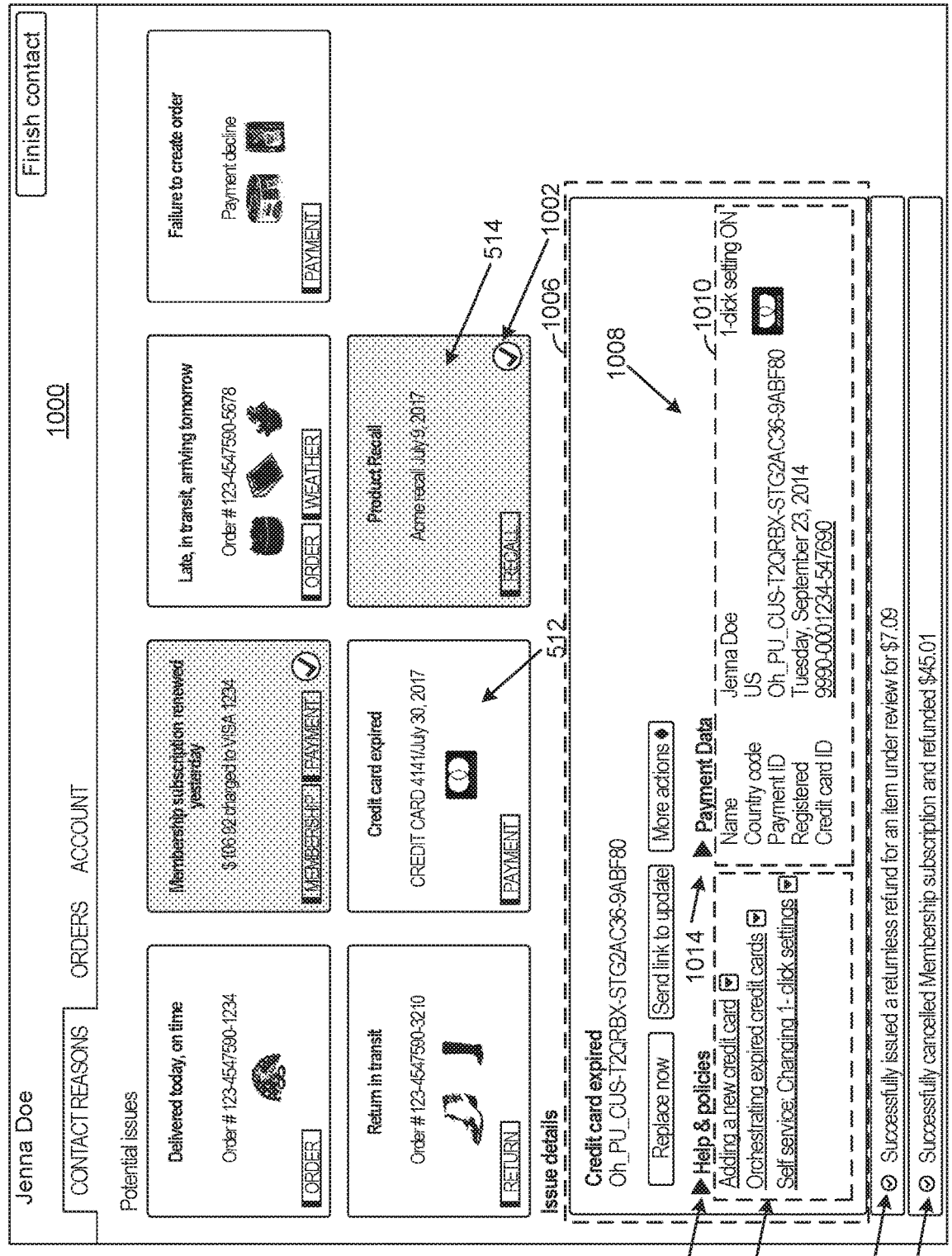

Subsequent to selecting the submit button 908, the predictive interface engine (e.g., the predictive interface engine 301 of FIG. 3) may provide UI 1000 of FIG. 10.

FIG. 10 includes UI 1000 that depicts a change in the content of the UI 900 of FIG. 9 once a user (e.g., CSA 118 of FIG. 1) has selected the submit button 908 of FIG. 9. In some embodiments, the match card 514 may be modified after selection of the submit button 908 to indicate the issue corresponding to the match card 514 was resolved. The particular modifications may vary. As depicted in FIG. 10, the match card 514 may be darkened and icon 1002 (e.g., a checkmark) may be displayed within the match card 514. In some embodiments, display of the text describing the status update displayed at 910 of FIG. 9 may persist. In some embodiments, another status update may be displayed at 1004 corresponding to the selection of the resolution option 808 of FIG. 8 and subsequently the selection of the submit button 908 of FIG. 9.

In some embodiments, the user may then select match card 512. Upon selecting match card 512, additional data may be presented within area 1006, an area configured to display this additional data. By way of example, area 1006 may include resolution data 1008. Resolution data 1008 may include, but is not limited to any suitable portion of user account data (e.g., payment data, payment method selections such as 1-click settings, etc.) associated with the user (e.g., a caller calling into a customer service center), any suitable supplemental data (e.g., hyperlinks to help guides, policy documents, etc.) and/or any suitable resolution options (e.g., resolution options). The resolution data 1008 may be identified utilizing a predefined template, or the resolution data 1008 may be identified utilizing a model trained to identify resolution data 1008 based at least in part on user account data and the issue corresponding to match card 512.

Similar to the examples of FIGS. 6 and 8, resolution data 1008 may include any suitable combination of resolution data 1010 and resolution data 1012. The placement and visibility of resolution data 1010 and/or resolution data 1012 may be identified based at least in part on respective likelihoods that the data is relevant to the selected issue. The determination of the likelihood that the data is relevant to the selected issue may be identified based at least in part on a predetermined data type selection rule set and/or a previously trained machine-learning model. User interface options 1014 and 1016 may be provided to enable the user to toggle between expanded (visible) and collapsed (hidden) views of the resolution data 1010 and 1012, respectively. Any selections of user interface options 1014 and 1016 may be utilized as signals to retrain and/or update the machine-learning model and/or the data type selection rule set to more accurately identify relevant data for a given issue over time.

FIG. 11 depicts UI 1100 as provided by the predictive interface engine (e.g., the predictive interface engine 301 of FIG. 3), according to some embodiments. The UI 1100 may be utilized to generate a summary communication after a session has been ended (e.g., after a session between the user 110 of FIG. 1 and the CSA 118 of FIG. 1 has ended) or at any suitable time (e.g., while the session is ongoing). In some embodiments, status updates 1102 may include the status updates displayed at 710, 910, and 1004 of FIGS. 7, 9, and 10, respectively. The status updates 1102 may include any suitable number of status updates depending on the number of issues addressed by the CSA 118.

In some embodiments, UI 1100 may include an option 1104 that may enable the CSA 118 to input another issue which may have been resolved during the call. It should be appreciated that the predictive interface engine 301 may be configured to utilize any match card selections (e.g., the match card selections discussed in connection with the FIGS. 6 and 8 and any subsequent match card selections made by the CSA 118) as evaluation data with which any suitable model trained by the predictive interface engine 301 may be evaluated. By way of example, the selections of match card 504 followed by the selection of match card 514 as discussed above in connection with the FIGS. 5-10 may be utilized to evaluate whether the model trained to identify issues that are likely being experienced by the caller accurately identified such issues. In some embodiments, manual additions of issues utilizing the option 1104 may also be utilized to identify instances in which the model potentially missed identifying an issue as being one likely experienced by the user. Based on this feedback, this data may be utilized to retrain and/or update the model such that its accuracy can be improved over time. In some embodiments, the selections of match card 504 and 514 (and even the order of such selections) may similarly be utilized to evaluate and potentially retrain/update a model utilized to determine the ranking of the issues corresponding to the match cards 502-514 of FIG. 5. If a predetermined ranking rule set was utilized to identify the ranking order of match cards 502-514, the match card selections may be utilized to adjust the predetermined ranking rule set. By way of example, a rule can be created that indicates a membership subscription renewal issue may be ranked higher in importance than an issue associated with an item delivered on the same day as the call. It should be appreciated that a threshold number of similar findings may be required (e.g., 100 times that a match card corresponding to a membership renewal issue was selected before a match card associated with an item that was delivered that day) before an update to the predetermined ranking rule set may be made.

In some embodiments, UI 1100 may be automatically populated with text corresponding to the issues resolved as identified by status updates 1102. Example text is depicted at 1106. The particular text provided may be generated by the predictive interface engine 301 based at least in part on any suitable number of templates corresponding to issue resolutions (e.g., corresponding to the issues associated with the match cards 504 and 514). The text 1106 may be editable by the user (e.g., the CSA 118).

In some embodiments, upon selecting the UI element 1108, an electronic communication (e.g., an email, a text message, or the like) including the text 1106 (as defined when the UI element 1108 was selected) may be transmitted to the user (e.g., CSA 118).

In some embodiments, the UI 1100 may further display metric data 1110. Metric data 1110 may include, but is not limited to, a number of resolutions performed during the session, an amount of time between the start of the session and selection of a first match card, an average time associated with resolving a single issue in the session as compared to an overall average time associated with resolving a single issue, and the like. In some embodiments, the UI 1100 may further include one or more tips (e.g., provided via UI elements 1112). The particular tips provided may be selected from a collection of predetermined tips (e.g., maintained by the predictive interface engine 301). In some embodiments, the tips may be associated with an issue and/or category of issues. The predictive interface engine 301 may select any suitable number of tips corresponding to the issues and/or category of issues associated with match cards 504, 512, and 514 of FIG. 5 based on the status updates 1102 indicating that the corresponding issues were resolved.

Figure 12:
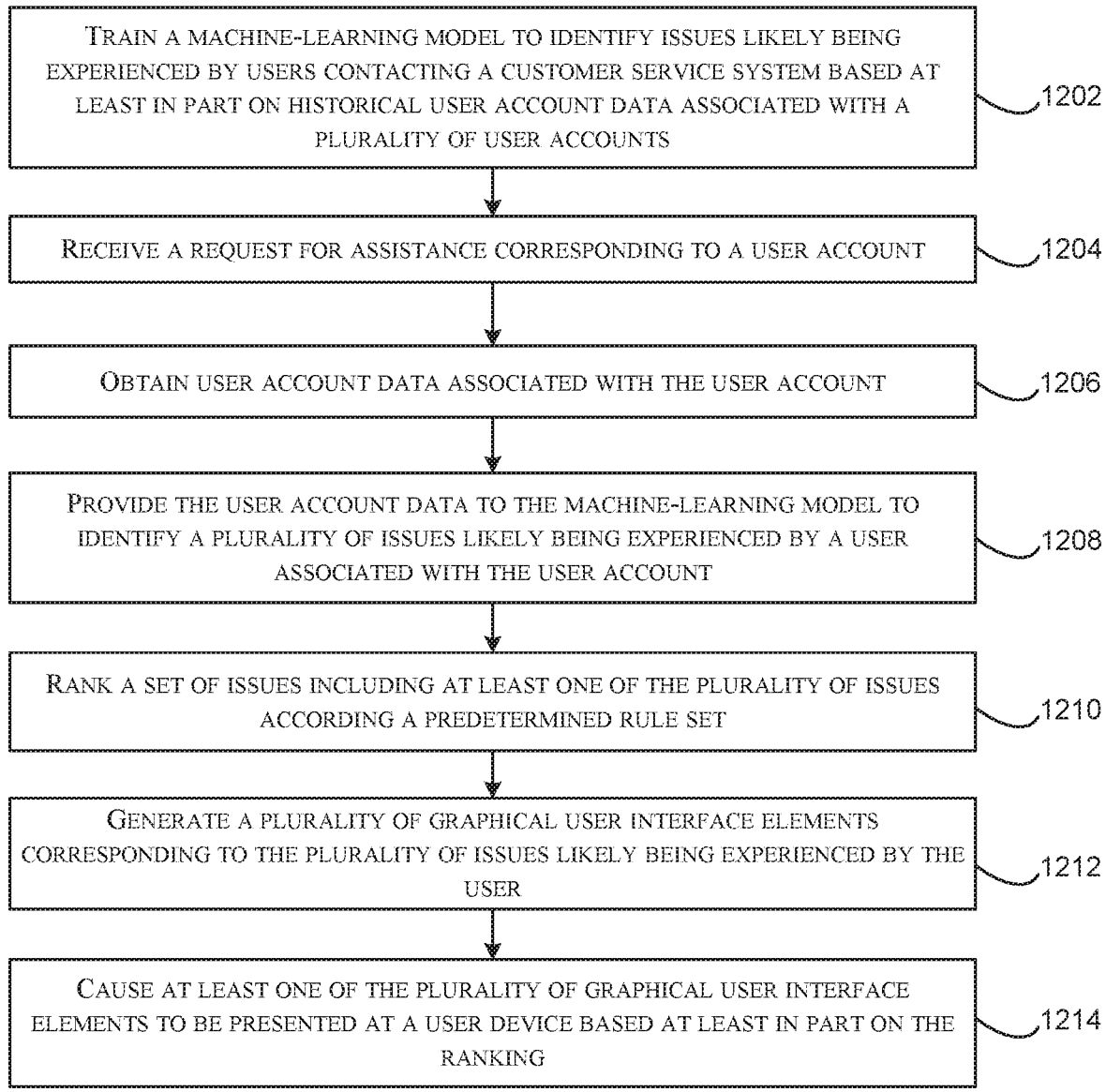
FIG. 12 is a flowchart illustrating an example method for providing predictive interface elements utilizing a predictive interface engine, in accordance with at least one embodiment.

FIG. 12 is a flowchart illustrating an example method 1200 for providing predictive interface elements utilizing a predictive interface engine, in accordance with at least one embodiment. It should be appreciated that the operations of the method 1200 may be performed in any suitable, not necessarily the order depicted in FIG. 12. Further, the method 1200 may include additional, or fewer operations than those depicted in FIG. 12. The operations of method 1200 may be performed by any suitable combination of the modules 302 of the predictive interface engine 301 of FIG. 3 which may operate in whole or in part on a user device (e.g., one or more of the user device(s) 204 of FIG. 2) and/or the service provider computer(s) 210 of FIG. 2. As a non-limiting example, the method 1200 may be performed by a computing device (e.g., the service provider computer(s) 210) having one or more processors and a memory storing executable instructions that, upon execution by the one or more processors, cause the user device to perform the operations of method 1200.

The method 1200 may begin at 1202, where a machine-learning model is trained (e.g., by the model manager 314 of FIG. 3) to identify issues likely being experienced by users contacting a customer service system based at least in part on historical user account data associated with a plurality of user accounts.

At 1204, a request for assistance corresponding to a user account may be received (e.g., by the data processing module 312 of FIG. 3). In some embodiments, the request may be routed (e.g., by the routing module 320 of FIG. 3) to a particular customer service agent (e.g., CSA 118 of FIG. 1) based at least in part on issues identified at 1208. In some embodiments, the request may include user identification data such as a name, address, phone number, username, password, pin, user device identifier, or the like with which the user may be authenticated.

At 1206, user account data associated with the user account may be obtained (e.g., by the data processing module 312 of FIG. 3). In some embodiments, the user account data may be retrieved from any suitable source (e.g., the user account data store 304) based at least in part on the user identification data received at 1204.

At 1208, the user account data may be provided to the machine-learning model to identify a plurality of issues likely being experienced by a user (e.g., the user 110 of FIG. 1) associated with the user account.

At 1210, a set of issues including at least one of the plurality of issues may be ranked (e.g., by the identification module) according a predetermined ranking rule set.

At 1212, a plurality of graphical user interface elements may be generated (e.g., by the interface management module 318) corresponding to the plurality of issues likely being experienced by the user.

At 1214, at least one of the plurality of graphical user interface elements may be caused (e.g., by the interface management module 318) to be presented at a user device based at least in part on the ranking.

Figure 13:
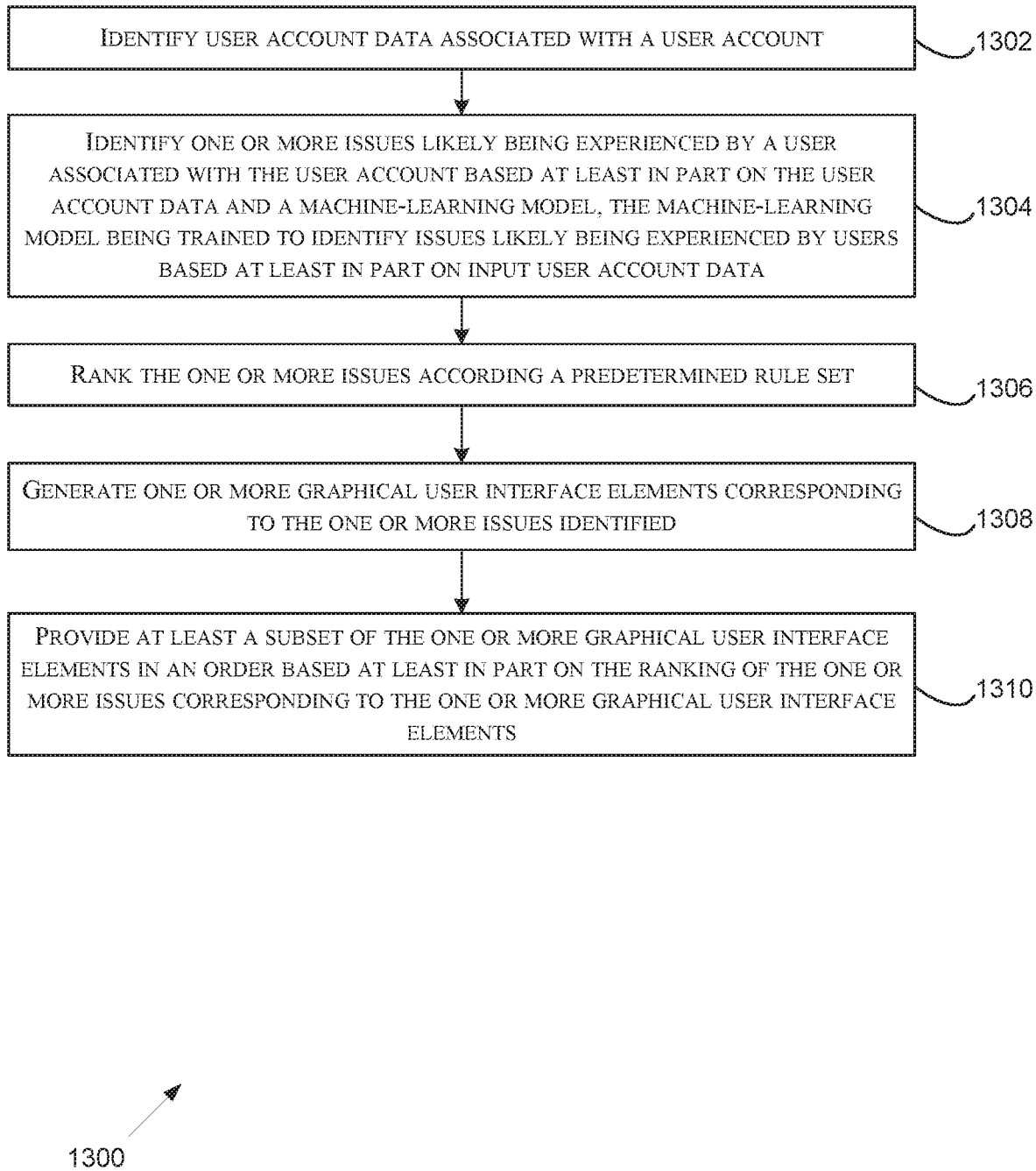
FIG. 13 is another flowchart illustrating another example method for providing predictive interface elements utilizing a predictive interface engine, in accordance with at least one embodiment.

FIG. 13 is another flowchart illustrating another example method 1300 for providing predictive interface elements utilizing a predictive interface engine (e.g., the predictive interface engine 301 of FIG. 3), in accordance with at least one embodiment. The method 1300 may be performed by a computing device (e.g., the service provider computer(s) 210 of FIG. 2). The computing device may comprise one or more processors and one or more memories collectively storing executable instructions that, when execution with the one or more processors, cause the computing system to perform the method 1300. It should be appreciated that the operations of the method 1300 may be performed in any suitable, not necessarily the order depicted in FIG. 13. Further, the method 1300 may include additional, or fewer operations than those depicted in FIG. 13. The operations of method 1300 may be performed by any suitable combination of the modules 302 of the predictive interface engine 301 of FIG. 3 which may operate in whole or in part on a user device (e.g., one or more of the user device(s) 204 of FIG. 2) and/or the service provider computer(s) 210 of FIG. 2.

The method 1300 may begin at 1302, where user account data associated with a user account may be identified (e.g., by the data processing module 312 of FIG. 3).

At 1304, one or more issues likely being experienced by a user associated with the user account may be identified (e.g., by the identification module 316 of FIG. 3) based at least in part on the user account data and a machine-learning model. In some embodiments, the machine-learning model may be trained (e.g., by the model manager 314 of FIG. 3) to identify likely issues experienced by users based at least in part on input user account data.

At 1306, the one or more issues may be ranked (e.g., by the identification module 316) according a predetermined ranking rule set.

At 1308, one or more graphical user interface elements corresponding to the one or more issues identified may be generated (e.g., by the interface management module 318 of FIG. 3).

At 1310, at least a subset of the one or more graphical user interface elements may be provided (e.g., by the interface management module 318 of FIG. 3) in an order based at least in part on the ranking of the one or more issues corresponding to the one or more graphical user interface elements.

Figure 14:
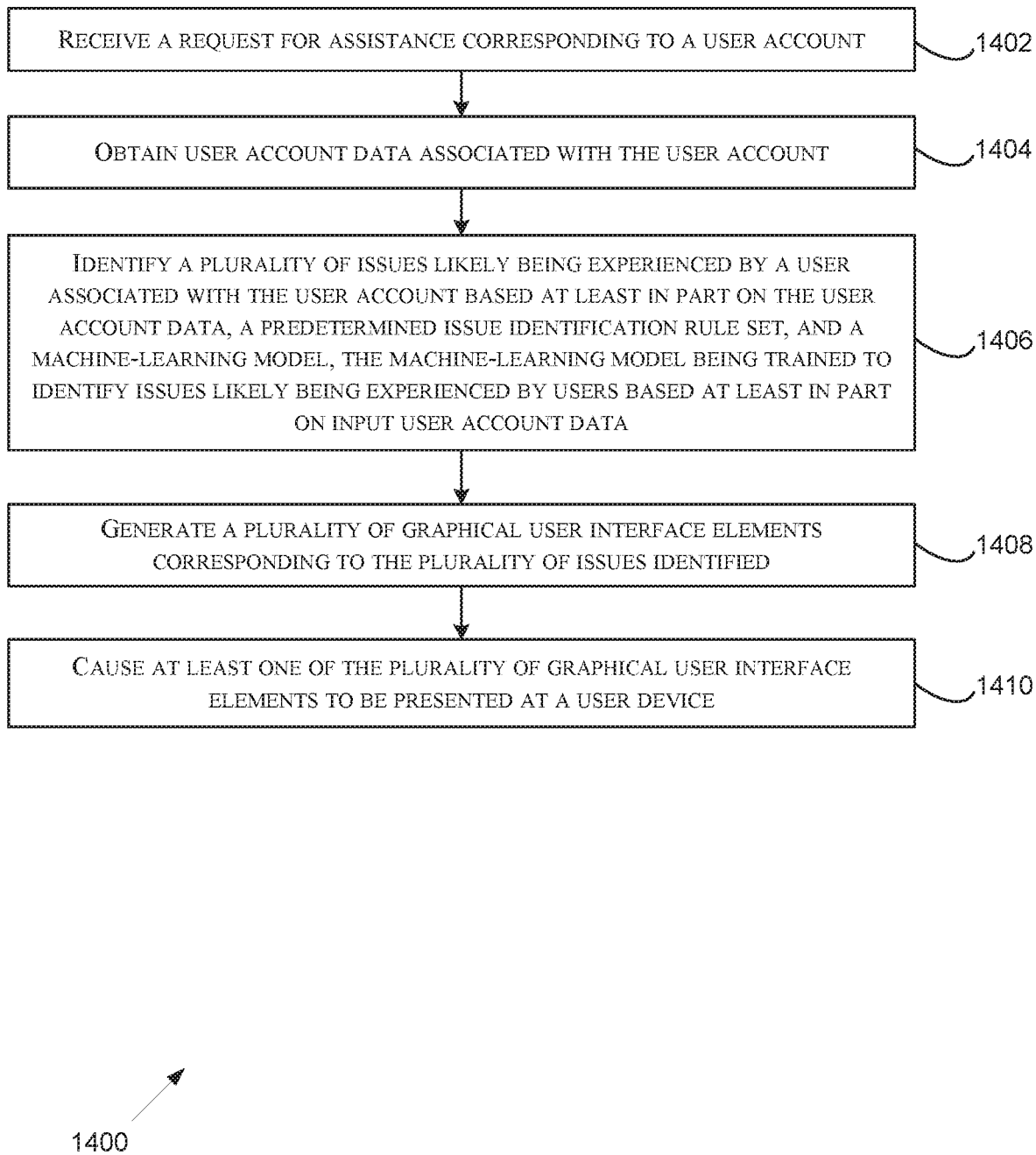
FIG. 14 is yet another flowchart illustrating yet another example method for providing predictive interface elements utilizing a predictive interface engine, in accordance with at least one embodiment.

FIG. 14 is yet another flowchart illustrating yet another example method 1400 for providing predictive interface elements utilizing a predictive interface engine (e.g., the predictive interface engine 301 of FIG. 3), in accordance with at least one embodiment. A computer-readable medium may store computer-executable instructions that, when executed by at least one processor, cause at least one computer to perform instructions comprising the operations of the method 1400. It should be appreciated that the operations of the method 1400 may be performed in any suitable, not necessarily the order depicted in FIG. 14. Further, the method 1400 may include additional, or fewer operations than those depicted in FIG. 14. The operations of method 1400 may be performed by any suitable combination of the modules 302 of the predictive interface engine 301 which may operate in whole or in part on a user device (e.g., one or more of the user device(s) 204 of FIG. 2) and/or the service provider computer(s) 210 of FIG. 2.

The method 1400 may begin at 1402, where a request for assistance corresponding to a user account may be received (e.g., by the data processing module 312 of FIG. 3).

At 1404, user account data associated with the user account may be obtained (e.g., by the data processing module 312 of FIG. 3).

At 1406, a plurality of issues likely being experienced by a user associated with the user account may be identified (e.g., by the identification module 316 of FIG. 3) based at least in part on the user account data, a predetermined issue identification rule set, and a machine-learning model. In some embodiments, the machine-learning model being trained (e.g., by the model manager 314 of FIG. 3) to identify likely issues experienced by users based at least in part on input user account data.

At 1408, a plurality of graphical user interface elements corresponding to the plurality of issues identified at 1406 may be generated (e.g., by the interface management module 318 of FIG. 3).

At 1410, a module of the predictive interface engine 301 (e.g., the interface management module 318) may cause at least one of the plurality of graphical user interface elements to be presented at a user device (e.g., the user device 113 of FIG. 1).

The various embodiments discussed above can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

Embodiments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
training, by a computing system, a machine-learning model to identify one or more issues likely being experienced by users contacting a customer service system based at least in part on historical user account data associated with a plurality of user accounts associated with a plurality of users of an electronic catalog, the historical user account data comprising data corresponding to interactions of the plurality of users at the electronic catalog;
receiving, by the computing system, a request for assistance corresponding to a user account;
obtaining, by the computing system, user account data associated with the user account;
providing, by the computing system, the user account data to the machine-learning model to identify a plurality of issues likely being experienced by a user associated with the user account the user account data being different from the request for assistance, the user account data being different from an issue description;
ranking, by the computing system, a set of issues including at least one of the plurality of issues according a predetermined rule set;
generating, by the computing system, a plurality of graphical user interface elements corresponding to the plurality of issues likely being experienced by the user; and
causing, by the computing system, at least one of the plurality of graphical user interface elements to be presented at a user device based at least in part on the ranking.

2. The computer-implemented method of claim 1, wherein instances of the historical user account data are previously identified as corresponding to one or more historical issues and one or more historical resolutions, the historical user account data being different from a description of an issue.

3. The computer-implemented method of claim 1, wherein the user account data comprises at least one of: order history, clickstream data, subscription information, user profile information, or billing activity information.

4. The computer-implemented method of claim 1, further comprising:
receiving, by the computing system, user input indicating a selection of a particular graphical user interface element corresponding to an issue of the plurality of issues;
obtaining resolution data indicating one or more potential resolutions to the issue;
generating an additional graphical user interface element comprising at least the resolution data; and
providing, by the computing system, the additional graphical user interface element.

5. A computing system, comprising:
one or more processors; and
one or more memories collectively storing computer-executable instructions that, when executed with the one or more processors, cause the computing system to, at least:
identify user account data associated with a user account of an electronic catalog, the user account data being different from an issue description;
identify one or more issues likely being experienced by a user associated with the user account based at least in part on providing the user account data as input to a machine-learning model, the machine-learning model being trained to identify issues likely being experienced by the user based at least in part on historical user account data associated with a plurality of user accounts that are associated with a plurality of users of the electronic catalog, the historical user account data comprising data corresponding to interactions of the plurality of users at the electronic catalog;
generate one or more graphical user interface elements corresponding to the one or more issues identified;
rank the one or more issues according a predetermined rule set; and
provide at least a subset of the one or more graphical user interface elements in an order based at least in part on the ranking of the one or more issues corresponding to the one or more graphical user interface elements.

6. The computing system of claim 5, wherein the ranking of the one or more issues further comprises:
identifying categories corresponding to the one or more issues;
obtaining a mapping of a plurality of categories to corresponding priority values;
identifying a particular priority value for each of the one or more issues based at least in part on the categories identified and the mapping; and
ranking the one or more issues based at least in part on the corresponding priority values.

7. The computing system of claim 5, wherein executing the instructions further causes the computing system to, at least:
receive user input indicating a selection of a particular graphical user interface element of the one or more graphical user interface elements; and
in response to receiving the user input, provide a subsequent graphical user interface element, the subsequent graphical user interface element comprising at least a portion of the user account data.

8. The computing system of claim 7, wherein the portion of the user account data of the subsequent graphical user interface element is identified based at least in part on an additional machine-learning model, the additional machine-learning model being trained to identify particular types of user account data that are relevant to a particular issue, the additional machine-learning model being trained based at least in part on historical action data indicating past actions taken in response to corresponding historical issues.

9. The computing system of claim 5, wherein executing the instructions further cause the computing system to, at least:
receive, by the computing system, a request for assistance corresponding to the user account; and
route the request for assistance to a particular service agent of a plurality of service agents based at least in part on the one or more issues identified.

10. The computing system of claim 5, wherein the machine-learning model is further trained to identify one or more potential resolutions to the one or more issues identified, the one or more potential resolutions each corresponding to one or more resolution actions.

11. The computing system of claim 5, wherein the machine-learning model is trained further based at least in part on transcription data comprising textual accounts of historical verbal interactions between a first user and a second user, the transcription data being associated with one or more historical issues.

12. The computing system of claim 5, wherein executing the instructions further cause the computing system to, at least, identify one or more additional issues based at least in part on an additional predetermined rule set and the user account data associated with the user account, wherein the one or more issues and the one or more additional issues are ranked based at least in part on the predetermined rule set and wherein at least one of the one or more additional issues is provided in a particular graphical user interface element of the one or more graphical user interface elements.

13. A non-transitory computer-readable storage medium having stored thereon computer-executable instructions that, when executed with one or more processors of a computer system, causes the computer system to perform operations comprising:
    receiving a request for assistance corresponding to a user account;
    obtaining user account data associated with the user account the user account data comprising data corresponding to interactions of a user at an electronic catalog, the user account data being different from a description of an issue;
    identifying a plurality of issues likely being experienced by the user associated with the user account based at least in part on the user account data, a predetermined issue identification rule set, and a machine-learning model, the machine-learning model being trained to identify one or more issues likely being experienced by users based at least in part on input user account data, the machine-learning model being trained based at least in part on historical user account data associated with a plurality of users of the electronic catalog and comprising data corresponding to interactions of the plurality of users at the electronic catalog;
    generating a plurality of graphical user interface elements corresponding to the plurality of issues identified; and
    causing at least one of the plurality of graphical user interface elements to be presented at a user device.

14. The non-transitory computer-readable storage medium of claim 13, wherein the predetermined issue identification rule set specifies rules for identifying the one or more issues based at least in part on the user account data associated with the user account.

15. The non-transitory computer-readable storage medium of claim 13, where the instructions, when executed, further cause the computer system to, at least:
    receive user input indicating a selection of a particular graphical user interface element of the plurality of graphical user interface elements, the particular graphical user interface element corresponding to a particular issue of the plurality of issues; and
    provide a subsequent graphical user interface element comprising at least a portion of the user account data and resolution data corresponding to the particular issue.

16. The non-transitory computer-readable storage medium of claim 15, wherein the resolution data indicates one or more actions available to solve the particular issue.

17. The non-transitory computer-readable storage medium of claim 13, where the instructions, when executed, further cause the computer system to, at least:
    maintain a record indicating a set of actions performed in response to user input; and
    generate an electronic correspondence summarizing the set of actions performed based at least in part on the record.

18. The non-transitory computer-readable storage medium of claim 13, where the instructions, when executed, further cause the computer system to, at least rank the plurality of issues based at least in part on a predetermined ranking scheme, wherein at least two of the plurality of graphical user interface elements are presented at the user device, and wherein the at least two of the plurality of graphical user interface elements are presented according to the ranking.

19. The non-transitory computer-readable storage medium of claim 18, wherein the predetermined ranking scheme identifies rules for ranking the plurality of issues based at least in part on at least one of: a timestamp corresponding to user account data associated with a particular issue of the plurality of issues, a category associated with the issue, or a determination that the user account data corresponds to a transaction.

20. The non-transitory computer-readable storage medium of claim 13, wherein the plurality of issues correspond to at least one of: an order associated with the user account, a shipment associated with the user account, a return order associated with the user account, a subscription associated with the user account, or payment data associated with the user account.

* * * * *